US012756459B2

(12) United States Patent
Lecoeuche et al.

(10) Patent No.: US 12,756,459 B2
(45) Date of Patent: Oct. 6, 2026

(54) OPTICAL TIME DOMAIN REFLECTOMETER (OTDR)-BASED FIBER MONITORING OPTIMIZATION

(71) Applicant: VIAVI SOLUTIONS INC., Chandler, AZ (US)

(72) Inventors: Vincent Lecoeuche, Tarentaise (FR); Benjamin Cuenot, Saint-Priest-en-Jarez (FR); Alexandre Cebollada, La Talaudiere (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 148 days.

(21) Appl. No.: 18/231,097

(22) Filed: Aug. 7, 2023

(65) Prior Publication Data

US 2025/0007604 A1 Jan. 2, 2025

(30) Foreign Application Priority Data

Jun. 29, 2023 (EP) .................................... 23306064

(51) Int. Cl.
*H04B 10/071* (2013.01)
*G01M 11/00* (2006.01)
(Continued)

(52) U.S. Cl.
CPC ....... *H04B 10/071* (2013.01); *G01M 11/3127* (2013.01); *H04J 14/0227* (2013.01); *H04Q 11/0005* (2013.01)

(58) Field of Classification Search
CPC ............ H04B 10/071; G01M 11/3127; G01M 11/3136; H04J 14/0227; H04Q 11/0005
See application file for complete search history.

(56) References Cited

U.S. PATENT DOCUMENTS 5,898,801 A * 4/1999 Braun ................ H04J 14/0241 398/59
6,005,694 A * 12/1999 Liu .................... H04Q 11/0062 398/31
(Continued)

FOREIGN PATENT DOCUMENTS

CN 204089819 U * 1/2015 ........... H04B 10/071
EP 3792777 A1 3/2021
(Continued)

OTHER PUBLICATIONS

Yuksel et al. ("Optical Layer Monitoring in Passive Optical Networks (PONs): A Review", Transparent Optical Networks, 2008. ICTON 2008. 10th Anniversary International Conference on, IEEE, Piscataway, NJ, USA, Jun. 22, 2008 (Jun. 22, 2008), pp. 92-98, XP031306064, ISBN: 978-1-4244-2625-6).*
(Continued)

*Primary Examiner* — Mohamed K Amara
(74) *Attorney, Agent, or Firm* — Mannava & Kang, P.C.

(57) ABSTRACT

In some examples, a tunable dense wavelength division multiplexing (DWDM) optical time domain reflectometer (OTDR) may include a fiber optic link analyzer, executed by at least one hardware processor, to tune a test wavelength of the DWDM OTDR to an effective wavelength of DWDM channels. A non-temperature compensated multiplexer/demultiplexer (Mux/DeMux) located at a distant location, collocated with, or embedded within the DWDM OTDR may selectively connect, based on the test wavelength, the DWDM OTDR to a fiber optic link of a plurality of fiber optic links to test the fiber optic link. A reflective device may be connected to an output of the Mux/DeMux to provide a reference for setting the test wavelength of the DWDM OTDR on a selected channel of the Mux/DeMux.

20 Claims, 18 Drawing Sheets

(51) Int. Cl.
*H04J 14/02* (2006.01)
*H04Q 11/00* (2006.01)

(56) References Cited

U.S. PATENT DOCUMENTS

| | | | | |
|---|---|---|---|---|
| 7,088,436 | B2 * | 8/2006 | Saunders | H04B 10/071 356/73.1 |
| 7,630,641 | B1 * | 12/2009 | Uhlhorn | H04B 10/071 398/28 |
| 8,369,706 | B2 * | 2/2013 | Sorin | H04Q 11/0067 398/67 |
| 10,181,900 | B2 | 1/2019 | Champavere | |
| 10,887,012 | B1 * | 1/2021 | Schneider | H04J 14/02 |
| 10,996,138 | B2 | 5/2021 | Lecoeuche | |
| 11,119,003 | B2 * | 9/2021 | Deng | H04J 14/0221 |
| 11,271,642 | B1 | 3/2022 | Ponchon | |
| 2003/0128917 | A1 * | 7/2003 | Turpin | H04J 14/0201 385/27 |
| 2006/0210271 | A1 * | 9/2006 | Mori | H04J 14/0307 398/71 |
| 2008/0019693 | A1 * | 1/2008 | Sorin | H04Q 11/0067 398/71 |
| 2010/0073667 | A1 * | 3/2010 | Cyr | G01M 11/336 356/73.1 |
| 2011/0026923 | A1 * | 2/2011 | Kim | H04J 14/025 359/344 |
| 2012/0224846 | A1 * | 9/2012 | Swanson | H04B 10/85 398/13 |
| 2013/0201316 | A1 * | 8/2013 | Binder | H04L 67/12 701/2 |
| 2016/0161397 | A9 * | 6/2016 | Cyr | G01M 11/3163 356/73.1 |
| 2017/0019168 | A1 * | 1/2017 | Menard | H04J 14/0213 |
| 2017/0294959 | A1 * | 10/2017 | Archambault | H04B 10/0775 |
| 2020/0292416 | A1 * | 9/2020 | Gagnon | H04B 10/07955 |
| 2021/0080349 | A1 | 3/2021 | Champavere | |
| 2023/0144154 | A1 * | 5/2023 | Giraud | G02B 6/3887 385/53 |
| 2025/0070905 | A1 * | 2/2025 | Su | H04Q 11/0005 |
| 2025/0110302 | A1 * | 4/2025 | Billor | H04J 14/05 |
| 2025/0266922 | A1 * | 8/2025 | Perry | H04J 14/0227 |

FOREIGN PATENT DOCUMENTS

| | | | | | |
|---|---|---|---|---|---|
| JP | H05231957 | A | * | 9/1993 | G01K 11/12 |
| WO | WO-2007014055 | A1 | * | 2/2007 | H04J 14/0226 |

OTHER PUBLICATIONS

Uran et al. "Fiber Plant Manager: An OTDR- and OTM-Based PON Monitoring System"; IEEE Communications Magazine , Feb. 2013, pp. S9-S15 (Year: 2013).*

K. Takada, M. Abe, M. Shibata, M. Ishii, and K. Okamoto "Low-Crosstalk 10-GHz-Spaced 512-Channel Arrayed-Waveguide Grating Multi/Demultiplexer Fabricated on a 4-in Wafer", IEEE Photonics Technology Letters, vol. 13, No. 11, Nov. 2001, pp. 1182-1184.

Kazumasa Takada et al., "1-GHz-Spaced 16-Channel Arrayed-Waveguide Grating for a Wavelength Reference Standard in DWDM Network Systems", IEEE Journal of Lightwave Technology, vol. 20, No. 5, May 2002, pp. 850-853.

Lakshmi Narayanan Venkatasubramani, Yi Lin, Colm Browning, Anirudh Vijay, Frank Smyth, R. David Koilpillai, Deepa Venkitesh, and Liam P Barry, "CO-OFDM for bandwidth-reconfigurable optical interconnects using gain-switched comb," OSA Continuum 3, 2925-2934 (2020), 10 pages.

Sterenn Guerrier, Christian Dorize, Elie Awwad, and Jérémie Renaudier, "Introducing coherent MIMO sensing, a fading-resilient, polarization-independent approach to ϕ-OTDR," Opt. Express 28, 21081-21094 (2020).

Vicente Duran et al., "Optical Frequency Combs Generated by Acousto-Optic Frequency-Shifting Loops", IEEE Photonics Technology Letters, vol. 31, No. 23, Dec. 1, 2019, pp. 1878-1881.

X. Zhou et al., "PDM-Nyquist-32QAM for 450-Gb/s Per-Channel WDM Transmission on the 50 GHz ITU-T Grid," in Journal of Lightwave Technology, vol. 30, No. 4, pp. 553-559, Feb. 15, 2012, doi: 10.1109/JLT.2011.2177243.

EPO, "The extended European search report for EP Application No. 24176035.4", dated Jan. 31, 2025, 12 pages.

EPO, "The partial European search report for EP Application No. 24176035.4", dated Oct. 25, 2024, 13 pages.

K. Yuksel et al., "Optical Layer Monitoring in Passive Optical Networks (PONs): A Review", Transparent Optical Networks, 2008, ICTON 2008. 10th Anniversary International Conference on, IEEE, Piscataway, NJ, USA, Jun. 22, 2008, pp. 92-98.

* cited by examiner

OPTICAL TIME DOMAIN REFLECTOMETER (OTDR)-BASED FIBER MONITORING OPTIMIZATION

PRIORITY

The present application claims priority under 35 U.S.C. 119(a)-(d) to European patent application number 23306064.9, having a filing date of Jun. 29, 2023, the disclosure of which is hereby incorporated by reference in its entirety.

BACKGROUND

A fiber optic cable may include one or more optical fibers. The optical fibers may transmit light from a source to a destination. The transmitted light may be backscattered and reflected. The backscattered and reflected light may be analyzed to determine properties of the optical fibers. An optical time domain reflectometer (OTDR) is the measuring device that uses Rayleigh backscatter to characterize fiber optic links. A single OTDR associated with an optical switch may be use to sequentially test several links in time division multiplexing mode.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
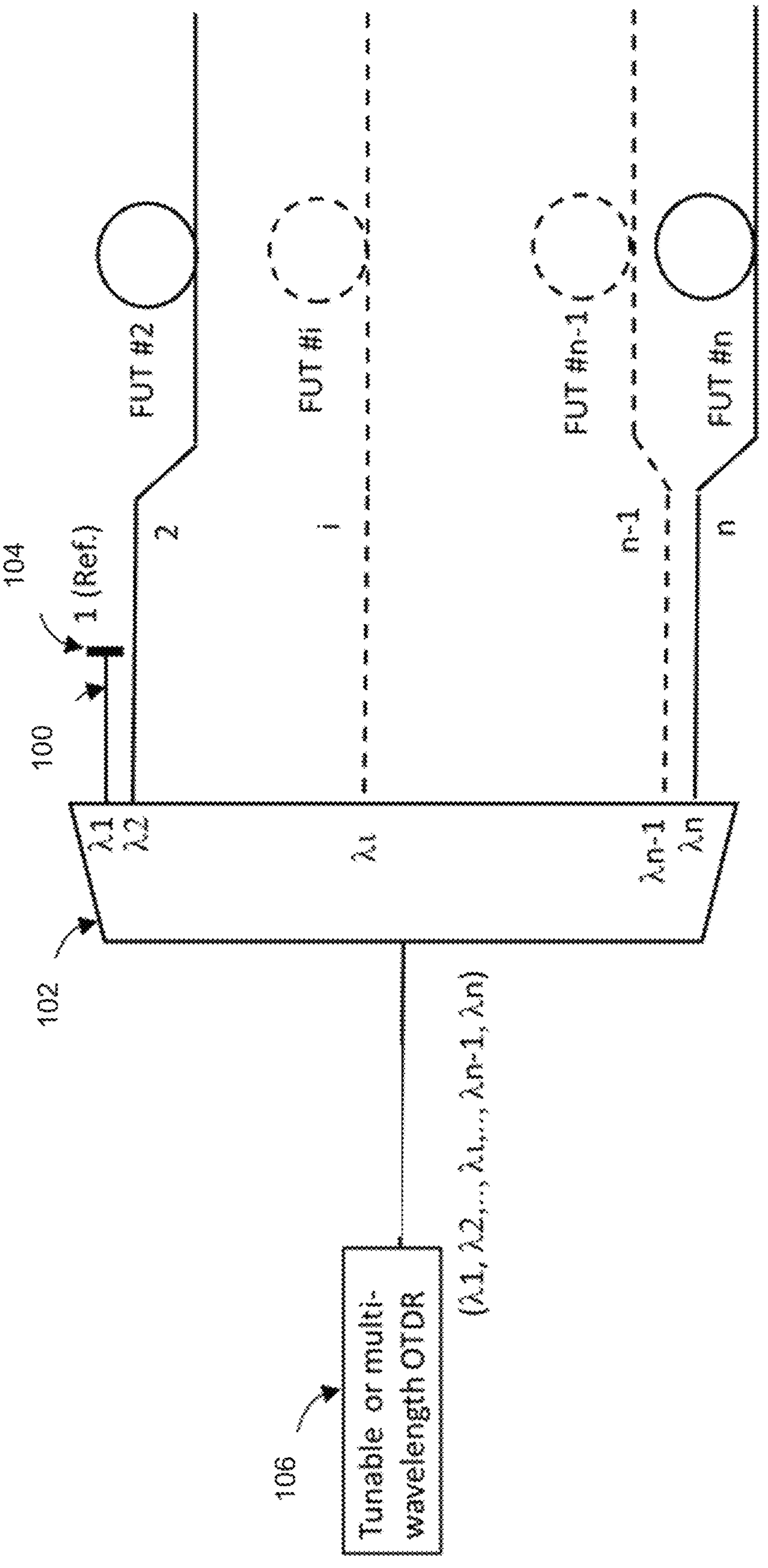
FIG. 1 illustrates a layout of an optical time domain reflectometer (OTDR)-based fiber monitoring optimization apparatus, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Optical time domain reflectometer (OTDR)-based fiber monitoring optimization apparatuses, and methods for OTDR-based fiber monitoring optimization are disclosed herein. According to examples disclosed herein, the apparatuses and methods disclosed herein provide a device including a tunable dense wavelength division multiplexing (DWDM) OTDR including a fiber optic link analyzer. The fiber optic link analyzer may determine, based on a user input and for a plurality of the fiber optic links, and if the fiber optic links are not active, which represents another condition in which a fiber optic link is not transmitting data, automatic tuning of a test wavelength of the OTDR to an effective wavelength of DWDM channels.

According to examples disclosed herein, the apparatuses and methods disclosed herein provide a non-temperature compensated Mux/DeMux located, for example, in distant premises, unpowered street cabinets, and collocated, for example, with a DWDM OTDR to selectively connect, based on a specified test wavelength, the DWDM OTDR to a fiber optic link of a plurality of fiber optic links to test the fiber optic link.

According to examples disclosed herein, the apparatuses and methods disclosed herein provide a reflective device connected to one of the Mux/DeMux outputs that may be used as a reference for setting an OTDR wavelength on a selected channel of a non-temperature compensated Mux/DeMux.

According to examples disclosed herein, a method for tunable OTDR-based fiber monitoring may include identifying, based on comparison of a real-time trace to traces acquired at different wavelengths associated with a fiber optic link, a central wavelength of a reference channel of a Mux/DeMux in order to redefine different test wavelengths of links through the Mux/DeMux.

According to examples disclosed herein, the tunable DWDM OTDR may be connected to a plurality of Muxes/DeMuxes through an optical switch.

According to examples disclosed herein, the tunable DWDM OTDR may further include a thermo-controlled distributed feedback laser that uses temperature to adjust a laser wavelength.

According to examples disclosed herein, the reflective device may include an optical connector assembled at an end of a reference channel output fiber.

According to examples disclosed herein, a reflective device may be omitted, and instead, a part or a totality of any of the fiber optic link backscattered signals may be utilized by maximizing an associated amplitude by wavelength tuning. In case of channel ambiguity because of a relatively large laser or Mux/DeMux drift, channels may be identified through a correlation calculus with respect to reference traces taken for each channel at the beginning of monitoring.

According to examples disclosed herein, the reflective device may be directly connected to a reference channel waveguide output facet, which is part of the Mux/DeMux chip.

According to examples disclosed herein, the reflective device may include a connectorized optical reflector plugged at an end of a reference channel output fiber.

According to examples disclosed herein, an electronic sensor may be connected to the OTDR system, and placed relatively close to the Mux/DeMux to measure temperature thereof.

According to examples disclosed herein, a fiber optic sensor may be connected to the OTDR by a fiber optic coupler and placed relatively close to the Mux/DeMux to measure temperature thereof.

According to examples disclosed herein, the temperature sensor may include a device that is wirelessly connected to the OTDR.

According to examples disclosed herein, a multicarrier OFDM technique may be used to simultaneously test a plurality of wavelength channels.

According to examples disclosed herein, the apparatuses and methods disclosed herein provide for tracking of drifts of a DWDM-comb with a laser-comb. In this regard, a laser-comb and a tunable filter at reception may be utilized to sequentially isolate channels. Signals may be simultaneously detected by utilizing an OFDM technique.

According to examples disclosed herein, the apparatuses and methods disclosed herein provide for use of a DWDM OTDR module with a Mux/DeMux sensitive to temperature variations (e.g., approximately 1.5 Ghz/° C. or 12 pm/C°). The Mux/DeMux channel bandwidth may be approximately 20 GHz.

The Mux/DeMux may be calibrated at a specified interval to adjust a DWDM laser frequency to a Mux/DeMux channel due to the Mux/DeMux temperature dependency.

Calibration of the Mux/DeMux may include searching for a maximum reflectance of a first calibration port of the Mux/DeMux dedicated for calibration. The first channel of known frequency reference Fr=196.1 THz may be equipped with a reflector.

According to examples disclosed herein, the apparatuses and methods disclosed herein provide for setting of a DWDM laser wavelength matching the Mux/DeMux channels.

In this regard, at every x period (e.g., few minutes), DWDM OTDR module calibration may be performed for the Mux/DeMux to turn the OTDR into real-time mode for making continuous measurements. Frequencies from the last possible frequency 196.2 THz up to Fr-60 GHz may be scanned by steps of 5 GHz. For each step of 5 GHZ, the last Fresnel maximum level may be determined, where the last Fresnel maximum level corresponds to the reflector. Once the scan is completed, the frequency effective band of the Mux/DeMux first calibration port, the maximum peak level for the scanned frequencies, and the band around that extremum of the peaks=+/−15% Mux/DeMux channel spacing (100 GHz) may be determined. On that 30 GHz band, the Mux/DeMux base effective frequency Fe may be determined by searching the centroid to find the central effective frequency Fe=Σ(Linear Level (step)×F (step))/Σ(Linear Level (step)), and Fe may be used as an effective base frequency for the Mux/DeMux.

Next, the shift DeltaF=Fr−Fe between the reference frequency of the Mux/DeMux and the effective frequency may be determined.

The frequency shift on the DWDM OTDR module may be determined as follows: Fr−DeltaF+(Mux/DeMux_Channel_Number×Mux/DeMux_Grid_Step)

Next, the DWDM OTDR module may be placed back to measurement mode.

The new frequency may be applied to the DWDM OTDR module.

The actual frequency of this retuning may depend on the ambient operating conditions, and in particular the rate of change of the temperature, which may be evaluated from previous tunings, and used to anticipate the drift in between two tunings.

The first search of the calibration port frequency may imply a scanning through the broadest frequency span. A subsequent search may be performed faster by scanning a smaller frequency span around the last value of the frequency.

In some cases, it may be desirable to maximize a number of addressable ports, while at the same time minimizing wavelength range. The number of wavelengths of a Mux/DeMux may be increased by reducing the spacing between channels. A tradeoff may be obtained by combining several Muxes/DeMuxes (hereafter N Muxes/DeMuxes) each having the same channel spacing(S) but an offset frequency S/N in between each combination (e.g., “comb”). The N Muxes/DeMuxes may be multiplexed with an N-output-ports interleaver. The interleaver may be configured to split an initial spectrum with a channel spacing S/N, into N interleaved comb with a spacing S, and an offset frequency matching the Mux/DeMux at each of its output. Since the Muxes/DeMuxes may freely drift with the same temperature dependence, the offset frequency of the Mux/DeMux may be set and controlled at a single and same temperature. The interleaver may also be matched at the same temperature, and have a same or close temperature dependency, for example by using the same PLC materials and process, on a same chip, or a close material (e.g., tapered fiber or bulk glass interferometer), and in some cases utilizing partial compensation to tune the thermal drift to the expected value as needed. In this interleaved configuration, as opposed to the use of optical switches and band splitters, the interleaver and Muxes/DeMuxes may be housed in the same box such that they share the same ambient temperature. The combination of an interleaver and Mux/DeMux may also reduce the crosstalk between ports, compared to a single Mux/DeMux configuration at the same spacing.

With respect to usage of AWG as disclosed herein, instead of an AWG, a WDM or Mux/DeMux may be utilized. For example, a WDM may include AWGs, thin film filters, FBGs, guided or bulk optics interferometers and interleavers, and other types of technologies. Similarly, a Mux/DeMux may include a family of components that includes AWGs. In this regard, various technologies may be utilized to track the wavelength drifts of a Mux/DeMux.

In some examples disclosed herein, a reference channel may be omitted, where each of the fibers under test, connected onto any of the Mux/DeMux ports, may itself be used as a reference for wavelength matching optimization, either using the Rayleigh backscattered level of a part of a detected OTDR trace, a given reflective event on the trace, or a total integrated signal (e.g., optical return loss of the fiber under test). In case the thermal drifts, error or non-linearity of the channel location or of the laser tuning may be large enough that a single wavelength may actually correspond to several output ports. In this regard, the ports may be scanned in their order of wavelength, starting the scan from out of band to determine the appearance of first channel without ambiguity, and the offset may be propagated as a starting offset to find the next channel. In case of a remaining ambiguity or a need for a fast random access, the correlation of the acquired OTDR trace may be determined with respect to each of a set of traces stored for reference, and a determination may be made as to which port is being addressed to correct the tuning accordingly.

For the apparatuses and methods disclosed herein, with respect to providing a means to control and optimize a fiber monitoring system in the presence of a network element in an unknown state, drift of a spectral profile of a WDM may be analyzed by tracking the drift with a tunable laser and maximizing the strength of a reflected and backscattered signal placed after that element.

With respect to active technology, another WDM technology may possibly have a control parameter. For example, Muxes/DeMuxes may be thermalized or athermal devices. In some cases, a non-athermal design may be utilized, whereas in other cases a drifting device that has a blind control parameter such as temperature or an electric field applied, which may have for example a lower loss, lower crosstalk, a smaller footprint compared to Mux/DeMux, etc., may be utilized. The control parameter of the device may be tuned to maximize its transmission, for example, to optimize the strength of a reflected/backscattered signal placed after that element. An example of an active optical component with a perfectible setting point may include a microelectromechanical systems (MEMS) switch, which drifts with temperature, and does not have a slightly different set point depending on wavelength.

The apparatuses and methods disclosed herein provide for tracking of drifts of a WDM with temperature, and utilizing a wavelength tunable OTDR and a reflective element (e.g., point reflection, backscattering or their combination). In this regard, the apparatuses and methods disclosed herein provide for control and optimization of a fiber monitoring system in the presence of a network component in an unknown state, based on an OTDR and a reflective element placed after that element. Based on a control parameter, either in the OTDR instrumentation side or in the network component itself, either the OTDR parameter (e.g., wavelength, polarization or any emission parameter that may have an influence on the network component transmission), or the active network component parameter (e.g., temperature, electric field or any setting accessible via direct or remote control that may have an influence on the network component transmission), or the both may be scanned. The component state and its transmission may thus be optimized as needed. In this regard, various multiplexing technologies may be utilized depending on the application (e.g., multiplexing technologies that include improved insertion loss (IL), lower crosstalk, lower polarization dependent loss (PDL), higher density, smaller footprint, etc.).

A first use-case may include the control of a MEMS optical switch, where the insertion loss of a MEMS switch changes with temperature and MEMS may include at least two positioning control parameters (e.g., the X and Y angles of the MEMS mirror). The apparatuses and methods disclosed herein provide for maximization of transmission of MEMS parameters. In some cases, besides the direct effect of temperature, the exact positioning of the MEMS may also degrade over time under extreme environmental conditions. In this regard, the precise MEMS switch positioning to the OTDR test wavelength, the fiber characterization of single-mode network may involve 1310 nm, 1550 nm, 1625 nm or 1650 nm wavelengths, while MEMS switch may be optimized to a single band set point with a degraded performance when broadband coverage is expected. A MEMS device may natively include a calibration table for any wavelengths, at any ambient temperature, and exploit an internal temperature probe. However, given the large port count considered in such applications, it may be preferable to have a single part number applicable to any application. Based on an automated in-application calibration, the insertion loss may be optimal, matched to the exact current conditions, and track the history and potential drifts over time of the device. In case that a tunable MEMS filter is needed in a monitoring network, the methods as disclosed herein are also applicable.

Aside the MEMS switch, other WDM devices may be utilized as disclosed herein.

The apparatuses and methods disclosed herein thus provide for the use of non-temperature compensated Muxes/DeMuxes and use of reflective event(s) to center the frequency of the OTDR on the channels. Further, the apparatuses and methods disclosed herein thus provide for the addition of the OFDM technique with a comb of local oscillators. In other examples disclosed herein, the apparatuses and methods disclosed herein provide for the combined use of Mux/DeMux and interleavers integrated in the same box. Yet further, the apparatuses and methods disclosed herein provide for the use on MEMS or optical switches. The apparatuses and methods disclosed herein also provide for the utilization of a Mux/DeMux device embedded in an OTDR.

In other examples, the apparatuses and methods disclosed herein provide for the use of an electronic sensor to serve as a temperature reference taken from a component (e.g., Mux/DeMux). In this regard, the component may be connected to a bus of the OTDR electronics via 2-wire buses (e.g., I2C, system management bus (SMBus)) or another bus to perform the monitoring and tuning of a test wavelength. The Mux/DeMux may be pre-characterized (e.g., at supplier, in production or even in self-calibration using the algorithm based on reflectometric analysis on the channels). With an I2C type bus, more than one Mux/DeMux type component or other interleavers may be addressed.

The apparatuses and methods disclosed herein also provide for the tracking of drifts of a DWDM-comb with a laser-comb. In this regard, a laser-comb and a tunable filter may be utilized at reception to isolate channels sequentially. Thus, signals may be detected simultaneously by exploiting an OFDM technique.

In some examples, for the apparatuses and methods disclosed herein, a Mux may be disposed in the same box as the OTDR. The box may be adjacently disposed or located at a distant location.

If the two devices are in the same box or next to each other, then the temperature of the Mux may be determined from the OTDR unit, and the temperature changes and associated drift may be tracked with a corresponding change of the OTDR tunable laser. If the two devices are distant and a communication means is provided at both sides, then a temperature measurement at the Mux site may be communicated to the OTDR unit.

In some examples, the apparatuses and methods disclosed herein also provide for tracking of the Mux drift by utilizing a continuously tunable OTDR and maximizing its transmission profile.

In other examples disclosed herein, the apparatuses and methods disclosed herein also provide for use of an extra coupler and an FBG to determine the temperature. The FBG may have nearly (but not exactly) the same drift coefficient as a planar waveguide Mux, and approximately the same wavelength profile as one transmission peak of the Mux/DeMux.

When a gridless freerunning Mux/DeMux component is located inside the OTDR system, an FBG type optical sensor may be utilized to measure the temperature on this component. This fiber sensor may utilize a 2×2 OTDR coupler instead of a 2×1 (transmit/receive/DUT), with the fourth port being connected to the fiber optic sensor. The FBG may be used to determine the component temperature to adjust the test wavelengths across the channels.

In other examples disclosed herein, instead of the coupler and the FBG, the apparatuses and methods disclosed herein provide for use of an inscribed Bragg grating directly on the planar waveguide, on the input port. In this regard, the wavelength drift, as opposed to the temperature, may be tracked directly due to the same thermal expansion on the Bragg grating as across the waveguide. Thus the wavelength shift of the Bragg peak may match the wavelength shift of the Mux/DeMux peaks. Moreover, the reference peak may be present anywhere in the spectrum accessible with a tunable laser.

In some examples, the addition of reflective components, fiber with Bragg grating, and design of a specific planar component as integration of a Bragg grating may be implemented as disclosed herein. In other examples, the DUT signal may be utilized as support for tuning the test wavelength.

Based on the wavelength drift coefficient of a non-athermal Muxes/DeMuxes, or calibration of the exact value of this coefficient for each device, a reference wavelength of the Muxes/DeMuxes may be determined at a reference temperature (e.g., ambient of 25° C.), the laser may be tuned to track the wavelength drift, and to thus determine the temperature.

FBGs may be utilized as temperature sensors to measure the temperature by measuring the wavelength of the peak of reflection (use in reflection) or of the trough of attenuation (e.g., in transmission)

Utilization of an OFDM may include various applications as disclosed herein. In this regard, a Mux/DeMux (passively or actively) athermal may be replaced by a non-athermal Mux/DeMux, and specific tuning software may be utilized as disclosed herein.

According to examples disclosed herein, an apparatus may include an OTDR comprising a fiber optic link analyzer, executed by at least one hardware processor, to control an active network element and optimize its transmission properties to improve the quality of the test through it. An active network element may be collocated or distant to the OTDR, improving communication capacity and one or several control parameters that affects its transmission properties. A reflective device may be connected to an output of the active network element. In this regard, a fiber optic link may include the reflective device, which may be intentionally added and connected to an output of the active network element.

According to examples disclosed herein, the active network element may include an optical MEMS switch, the insertion loss of which may be optimized by changing the X and Y angle positioning of its MEMS mirror, and a maximization routine based on reflected or backscattered signals downward a switch port of the optical MEMS switch.

According to examples disclosed herein, the active network element may include an optical variable optical attenuator, the insertion loss of which may be controlled based on the reflected or backscattered signals downward of the optical variable optical attenuator.

According to examples disclosed herein, the active network element may include a bidirectional optical amplifier, the insertion loss of which may be controlled based on reflected or backscattered signals downward the bidirectional optical amplifier.

For the apparatuses and methods disclosed herein, based on the multicarrier OFDM solution, the measurement system may include simultaneous testing of all of the Mux/DeMux channels.

Figure 2:
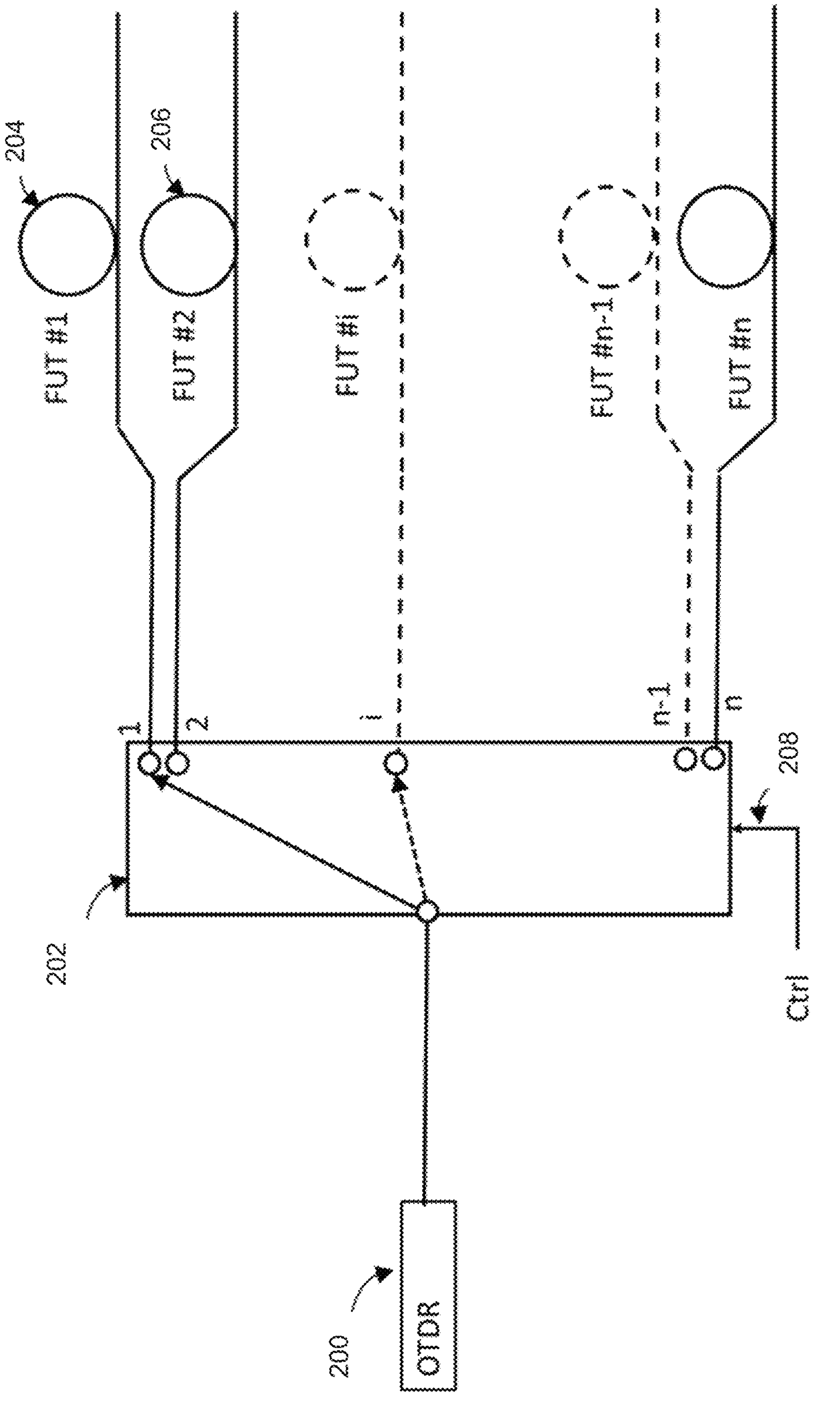
FIG. 2 illustrates sequential testing and spatial multiplexing by utilizing an optical switch, in accordance with an example of the present disclosure.

FIG. 2 illustrates sequential testing and spatial multiplexing by utilizing an optical switch, in accordance with an example of the present disclosure.

Referring to FIG. 2, OTDR 200 may be connected to an optical switch (1-to-n) 202 to multiple optical fiber links to be tested (FUT) such as FUTs 204 and 206 among others. A control command 208 of the optical switch 202 may establish selective optical continuity between the OTDR 200 and one of the links to be tested.

With continued reference to FIG. 2, according to examples disclosed herein, the OTDR 200 may include a fiber optic link analyzer that is executed by at least one hardware processor to control an active network element and optimize its transmission properties to improve the quality of the test through it. An active network element may be collocated or distant to the OTDR 200, improving communication capacity and one or several control parameters that affects its transmission properties. A reflective device may be connected to an output of the active network element. In this regard, a fiber optic link may include the reflective device, which may be intentionally added and connected to an output of the active network element. The control command 208 may provide for the selection of one output port, but may also provide for fine control of the optical alignment, a 2D control that may be available with an optical MEMS switch. In this regard, in one example, the active network element may include an optical MEMS switch, the insertion loss of which may be optimized by changing the X and Y angle positioning of its MEMS mirror, and a maximization routine based on reflected or backscattered signals downward a switch port of the optical MEMS switch. In another example, the active network element may include an optical variable optical attenuator, the insertion loss of which may be controlled based on the reflected or backscattered signals downward of the optical variable optical attenuator. In a further example, the active network element may include a bidirectional optical amplifier, the insertion loss of which may be controlled based on reflected or backscattered signals downward the bidirectional optical amplifier.

Figure 3:
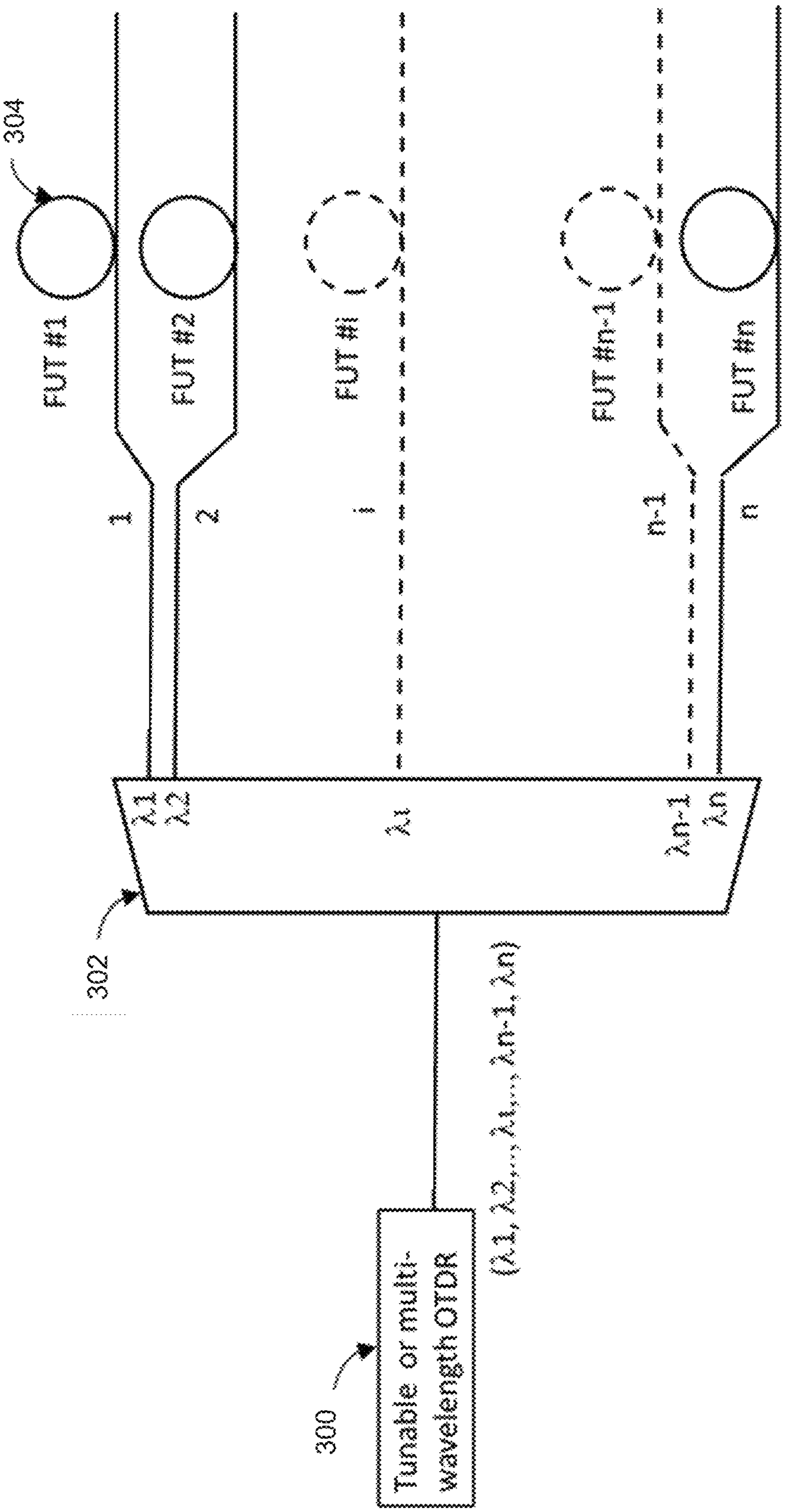
FIG. 3 illustrates utilization of a different test wavelength for each of the links to be tested, a tunable wavelength or multi-wavelength OTDR, and a wavelength demultiplexer whose outputs are connected to different links, in accordance with an example of the present disclosure.

FIG. 3 illustrates utilization of a different test wavelength for each of the links to be tested, a tunable wavelength or multi-wavelength OTDR, and a wavelength demultiplexer whose outputs are connected to different links, in accordance with an example of the present disclosure.

Referring to FIG. 3, wavelength division multiplexing, which does not require the use of an active component such as an optical switch, may be utilized. In this regard, a different test wavelength may be utilized for each of the links to be tested, as well as a tunable wavelength or multi-wavelength OTDR and a wavelength demultiplexer whose outputs are connected to different links. Referring to FIG. 3, an OTDR 300 may be utilized to carry out tests at different wavelengths corresponding to the output wavelengths of an optical demultiplexer 302. For example, if the OTDR is set to the wavelength λ1, the test signal will be transmitted to FUT 304. Thus, the OTDR wavelength may be adjusted to the output wavelength corresponding to the link that is to be tested. The test capacity with respect to a number of fiber optic links may depend on the number of wavelengths used. Thus, the use of dense wavelength demultiplexers may allow testing of up to approximately 50 different wavelengths on a Telecom grid at 50 GHz channel spacing (e.g., 0.4 nm in the C band). This potential may increase inversely with the spacing between adjacent channels. For example, for a 100 channels configuration, the test wavelength of the OTDR may need to be adjusted to the wavelength corresponding to the DWDM frequency grid (e.g., UTU-T G.694.1 standard). Thus, the wavelength set on the OTDR as well as the wavelength of the corresponding channel on the multiplexer may be stable over time and within an operating temperature range.

Figure 4:
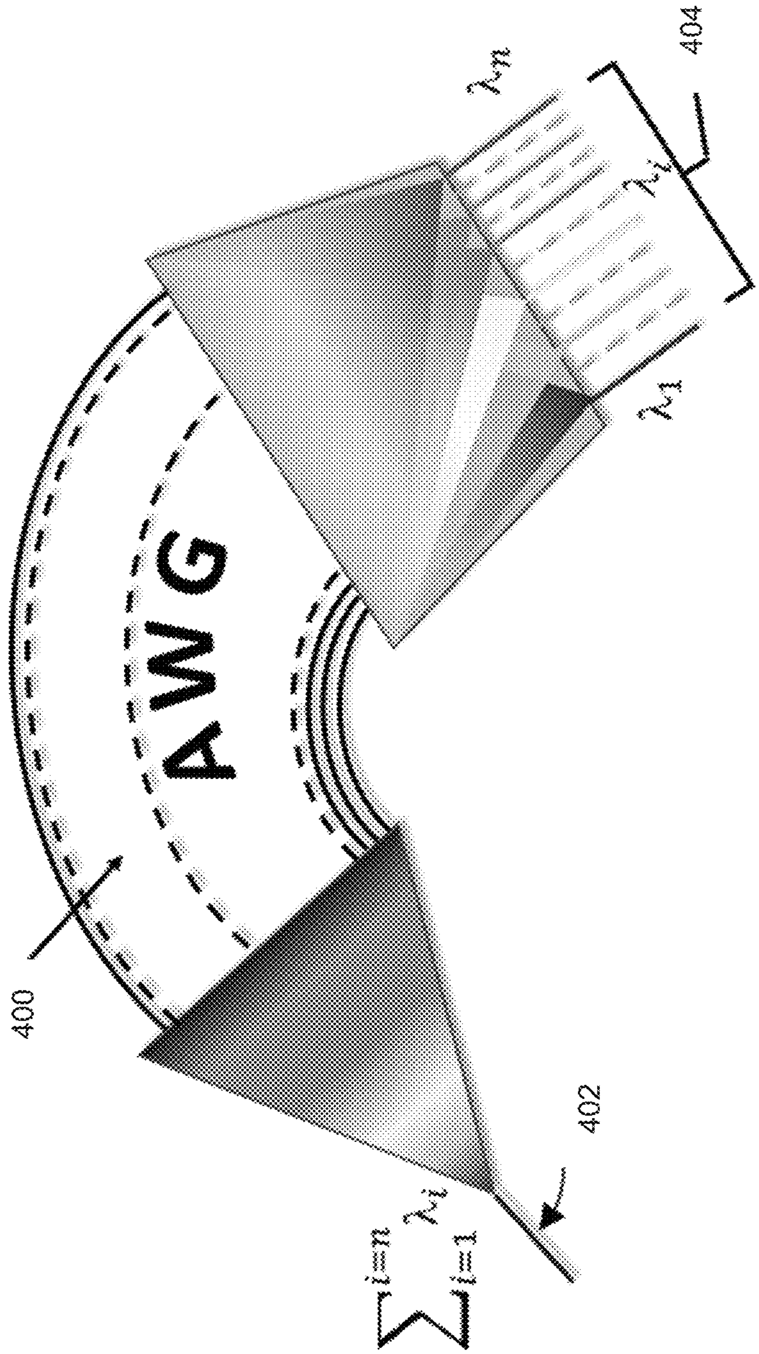
FIG. 4 illustrates arrayed waveguide gratings (AWG) multiplexers/demultiplexers as planar devices that are based on an array of waveguides with both imaging and dispersive properties, in accordance with an example of the present disclosure.

FIG. 4 illustrates arrayed waveguide gratings (AWG) multiplexers/demultiplexers as planar devices that may be based on an array of waveguides with both imaging and dispersive properties, in accordance with an example of the present disclosure.

Referring to FIG. 4, AWGs used in wavelength Mux/DeMux may be used in communication networks. AWGs may represent multiport optical filters that have a large number of waveguides in an array. Due to the interference of multi-paths of these waveguides, a relatively high extinction rate may be realized as a Bragg grating.

AWGs may be used in high-capacity optical transmission systems as an optical Mux/DeMux that combines (multiplexes) and/or separates (demultiplexes) optical signals of different wavelengths.

In a Dense Wavelength Division Multiplexing (DWDM) system, each component may need to have high optical wavelength stability. For telecom applications, specific DWDM components considered athermal may be used in order to remain aligned with an International Telecommunication Union (ITU) grid.

As shown in FIG. 4, AWG multiplexers/demultiplexers may be planar devices that are based on an array of waveguides 400 with both imaging and dispersive properties. In the case of an OTDR-based monitoring application, the signal from the OTDR may be connected to a common input at all wavelengths 402 and the FUT, to the different colored outputs 404.

DWDM multiplexers that use AWG technology may achieve very fine inter-channel spacing. Without compensation, the drift in the wavelength of these components as a function of temperature may be on the order of 1.1 to 1.3 nm over a range of 100° C. Yet further, athermal components have been developed to reduce this temperature sensitivity. Since the transmission wavelength of an AWG is temperature dependent, the temperature may be controlled using heating elements or a Peltier thermocouple element. In some cases, combinations of different materials may be utilized to passively compensate the thermal expansion and limit the wavelength drift. A fully passive device may not utilize a power supply for thermal stabilization, and may thus be suited for use in applications where no power is available.

In some cases, the athermal design may include higher complexity and relatively additional cost compared to an uncompensated component. The use of an AWG without a temperature compensation or regulation device may be incompatible with the use of a fixed wavelength grid for OTDR monitoring.

In this regards, an optical switch followed by a DWDM Mux/DeMux may be utilized to increase the number of monitored fiber links.

Figure 5:
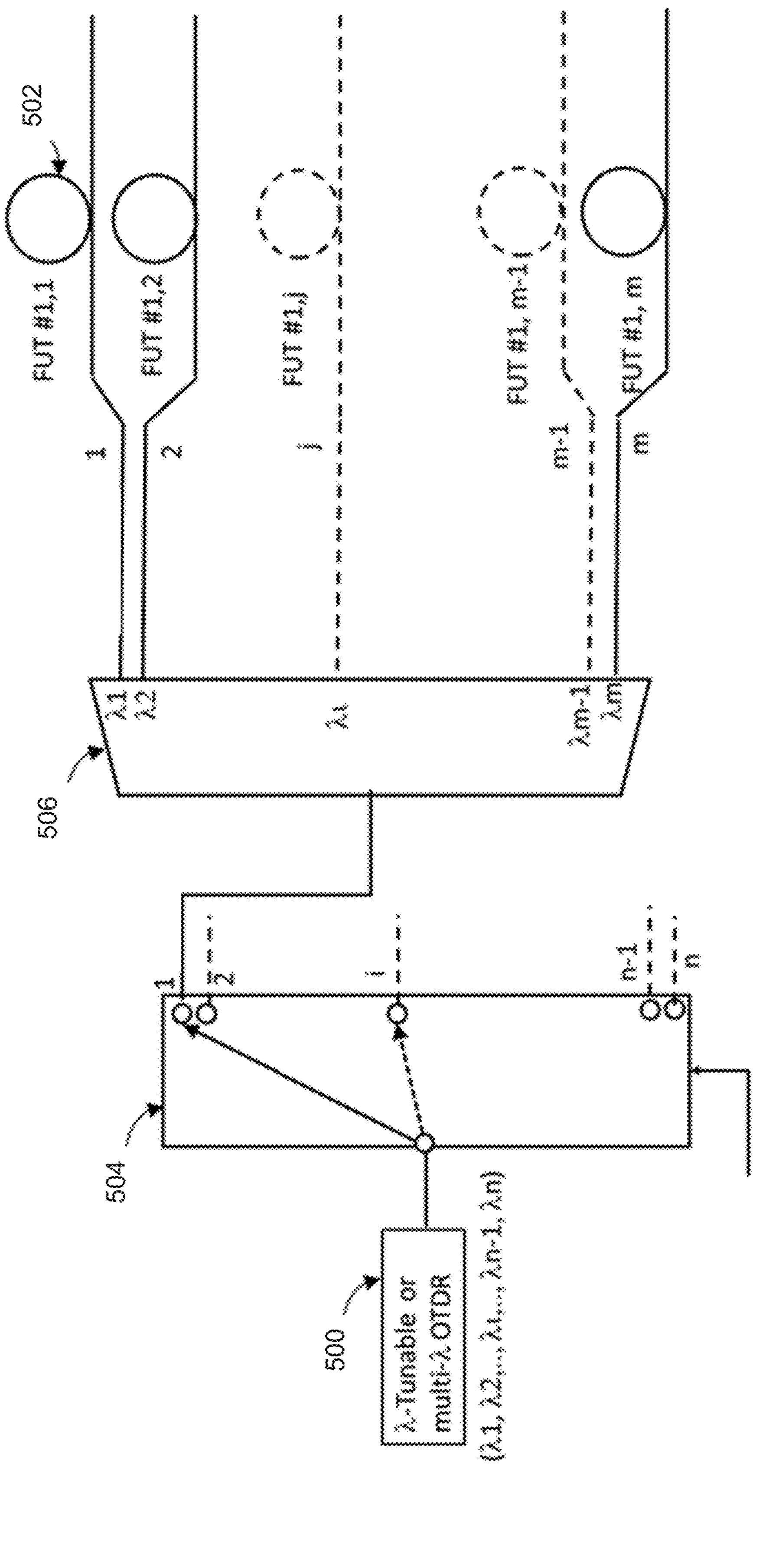
FIG. 5 illustrates an arrangement using a tunable OTDR testing several fiber under tests (FUTs) through an optical switch with several Muxes/DeMuxes connected to OTDR outputs, in accordance with an example of the present disclosure.

FIG. 5 illustrates an arrangement using a tunable OTDR testing several FUTs through an optical switch with several Muxes/DeMuxes connected to the OTDR outputs, in accordance with an example of the present disclosure.

Referring to FIG. 5, a tunable OTDR 500 may be utilized to test a plurality of FUTs 502 through an optical switch 504 with several Muxes/DeMuxes 506 connected to its outputs 1 to n. In this example, the maximum capacity may be up to n by m FUTs.

DWDM (e.g., ITU-T G.694.1) channel spacing is 0.8/0.4 nm (100 GHz/50 GHz grid). Smaller channel spacing may allow more information to be transmitted simultaneously. With a channel spacing of 12.5 Ghz, it may be possible to transmit more than 500 L-band channels (1565 nm-1625 nm). In some cases, it may be possible to implement distances between channels of 10 GHz or even 1 GHz with constraints linked to the management of temperature controlled at +/−0.1° C.

The wavelength of a tunable OTDR may be adjusted to center on a specific DWDM channel. Solutions based on the wavelength scanning analysis of the signal level downstream of the Mux/DeMux may make it possible to identify the wavelength or even the spectral width of a DWDM channel.

However, Muxes/DeMuxes may exhibit temperature sensitivity. Since waveguide material may generally have a temperature-dependent index of refraction, the channel wavelength of an Mux/DeMux may shift as temperature varies. This shift, which may be on the order of 0.01 nm/° C. in silica-based devices, may cause signal loss or crosstalk in the optical communication system but also in monitoring systems using OTDRs aligned on the predefined wavelength grid (e.g., ITU-T standard). The temperature insensitive Muxes/DeMuxes may require a high degree of process control or the possibility to trim the devices. In this regard, the apparatuses and methods disclosed herein provide for the use of a non-temperature compensated Mux/DeMux in order to avoid the additional cost of athermal Muxes/DeMuxes to the OTDR-based fiber monitoring system. In order to accommodate the thermal drift of the free-running Mux/DeMux, the optical source of the OTDR may be tuned on the actual wavelength of the Mux/DeMux channels. A specific Mux/DeMux channel may serve as the reference channel and may be used to set the OTDR wavelength. The wavelengths of the other channels may be adjusted while taking into account the necessary offset applied to the reference channel.

For the apparatuses and methods disclosed herein, an optical reflector may be connected to the output corresponding to the reference channel. Thus, the search for the reference wavelength may be based on optimization of the signal amplitude reflected by the reflector placed on the reference channel. Alternatively, a piece of fiber on the reference channel may be used to optimize the power level detected associated with the Rayleigh backscattered power level. In some cases, a reference channel may not even be required, and each of the fibers under test (FUTs), connected onto the Mux/DeMux port may itself be used as a reference for wavelength matching optimization, either using the Rayleigh backscattered level of a part of the detected OTDR trace, or a given reflective event on the trace, or the total integrated signal (denoted Optical Return Loss (ORL) of the fiber under test). The solution of utilizing the test ports rather than a reference port may be particularly beneficial in case the Mux/DeMux cannot have a perfectly even wavelength spacing or the laser tuning cannot be achieved with sufficient accuracy. Depending on the source of the mistuning, with a predictable or random nature in the wavelength domain, and stable or varying in the time domain, every single port may be tuned frequently, or only a few ports may be tuned occasionally, possibly with some wavelength interpolation or temporal extrapolation steps, as applicable.

For improved performance especially in difficult environments (e.g., street cabinet with direct exposure to the sun), the mechanical integration of the Mux/DeMux may need to be optimized to ensure best thermal stability, for example, by means of thermal insulation or thermal capacity.

FIG. 1 illustrates a layout of an example optical time domain reflectometer (OTDR)-based fiber monitoring optimization apparatus (hereinafter also referred to as "apparatus 100").

Referring to FIG. 1, The output fiber 100 of the Mux/DeMux 102 may be connected to a broadband optical reflector 104. The broadband optical reflector 104 may serve as a reference for finding the central wavelength λ1 of channel 1.

During the wavelength tuning process, OTDR 106 may be used to perform successive measurements at different wavelengths in a wavelength range taking into account the dispersion of the device and the temperature-related drift of the Mux/DeMux. Different convergence techniques may be used to determine the test wavelength corresponding to the maximum signal reflected by the reflector.

The maximum value detection technique may be based on finding the wavelength with the highest reflection amplitude in the wavelength scan range.

A trace showing the reflection amplitude versus the OTDR test wavelength may be filtered to improve the accuracy. Thus, a linear-phase Finite Impulse Response (FIR) low-pass filter may be used to attenuate high-frequency noise, with a maximum peak value detection technique being used to find the peak. Other values such as the centroid may be determined. A central wavelength corresponding to the geometric center of gravity of the curve may also be determined. Further, least Squares fitting may be used to adjust models (e.g., polynomial functions) to fit the signal and then determine the peak on the models.

Figure 6B:
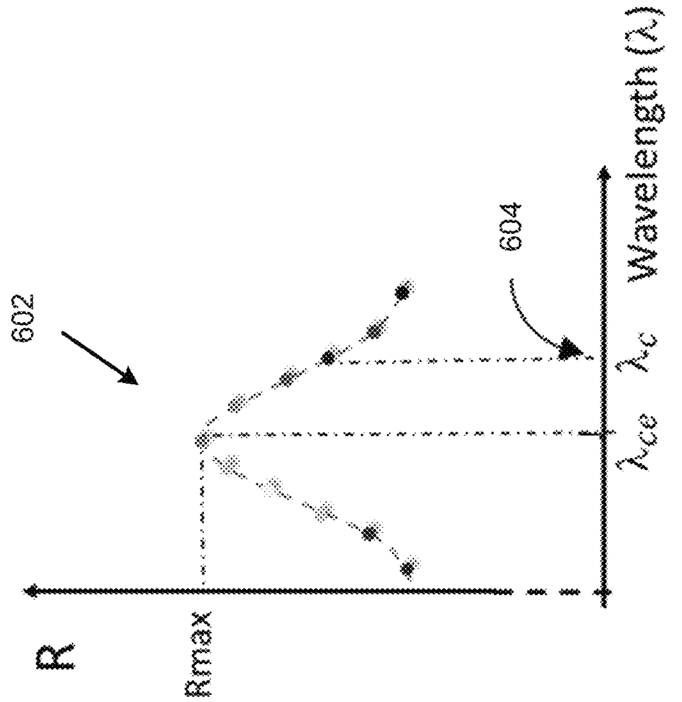
FIGS. 6A and 6B illustrate representations of a possible measurement principle for determining the effective center wavelength of a dense wavelength-division multiplexing (DWDM) channel for a non-temperature compensated Mux/DeMux in a given temperature environment, in accordance with an example of the present disclosure.
Figure 6A:
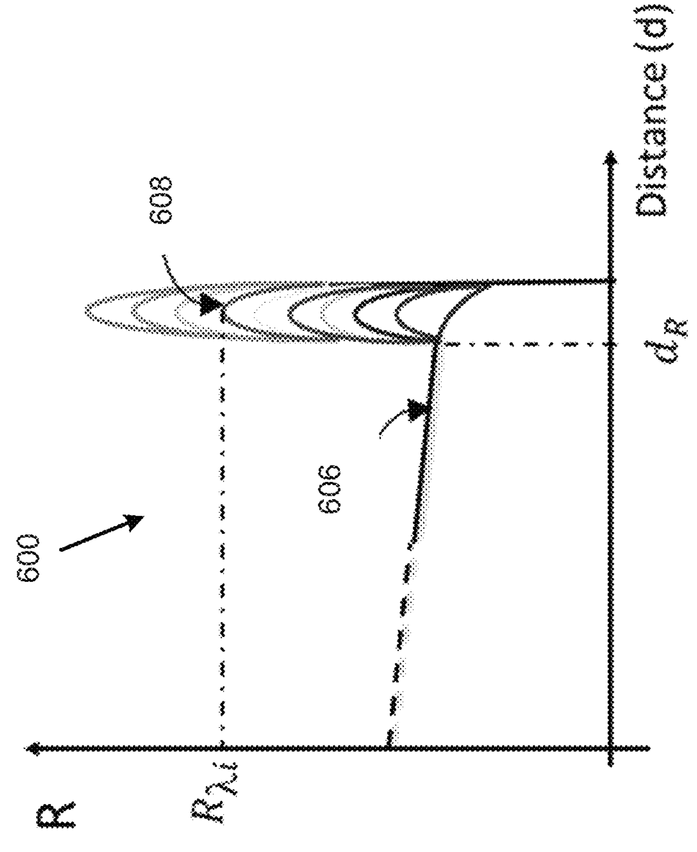

FIGS. 6A and 6B illustrate representations of a possible measurement principle for determining the effective center wavelength of a dense wavelength-division multiplexing (DWDM) channel for a non-temperature compensated Mux/DeMux in a given temperature environment, in accordance with an example of the present disclosure.

Referring to FIGS. 6A and 6B, representations of a possible measurement principle for determining the effective center wavelength of a DWDM channel for a non-temperature compensated Mux/DeMux in a given temperature environment are shown at 600 and 602.

The OTDR scans a range of wavelengths around the presumed central wavelength λc 604 taking into account the drift of the Mux/DeMux related to the temperature and the intrinsic uncertainties of both the OTDR laser and Mux/DeMux. Given that the uncertainties are eliminated when tuning the laser onto the Mux/DeMux resonance, a better insertion loss may be achieved compared to the insertion loss with both laser and Mux/DeMux set at some nominal wavelengths.

With respect to OTDR curve 606, the level of reflection of the reflective devices located at distance $d_R$ may vary according to the test wavelength value with respect to the effective center length λce. For example, for the test wavelength λl, the peak amplitude of the reflection 608 is Rλi. The central wavelength may be used to test this reference channel, as well as other channels of the Mux/DeMux. The knowledge of the central wavelength of the reference channel, which indirectly provides the operating temperature of the Mux/DeMux, may then be used to recalculate the central wavelengths of the other channels.

This wavelength adjustment from the reference channel may be carried out regularly, but may also take into account the thermal time constants of the Mux/DeMux, the variability of the ambient temperature, and the type of Mux/DeMux. Other techniques may be implemented to address a band of wavelength reflected based on the dispersion of wavelength of the reference channel according to the variation of the Mux/DeMux operating temperature.

Figure 7:
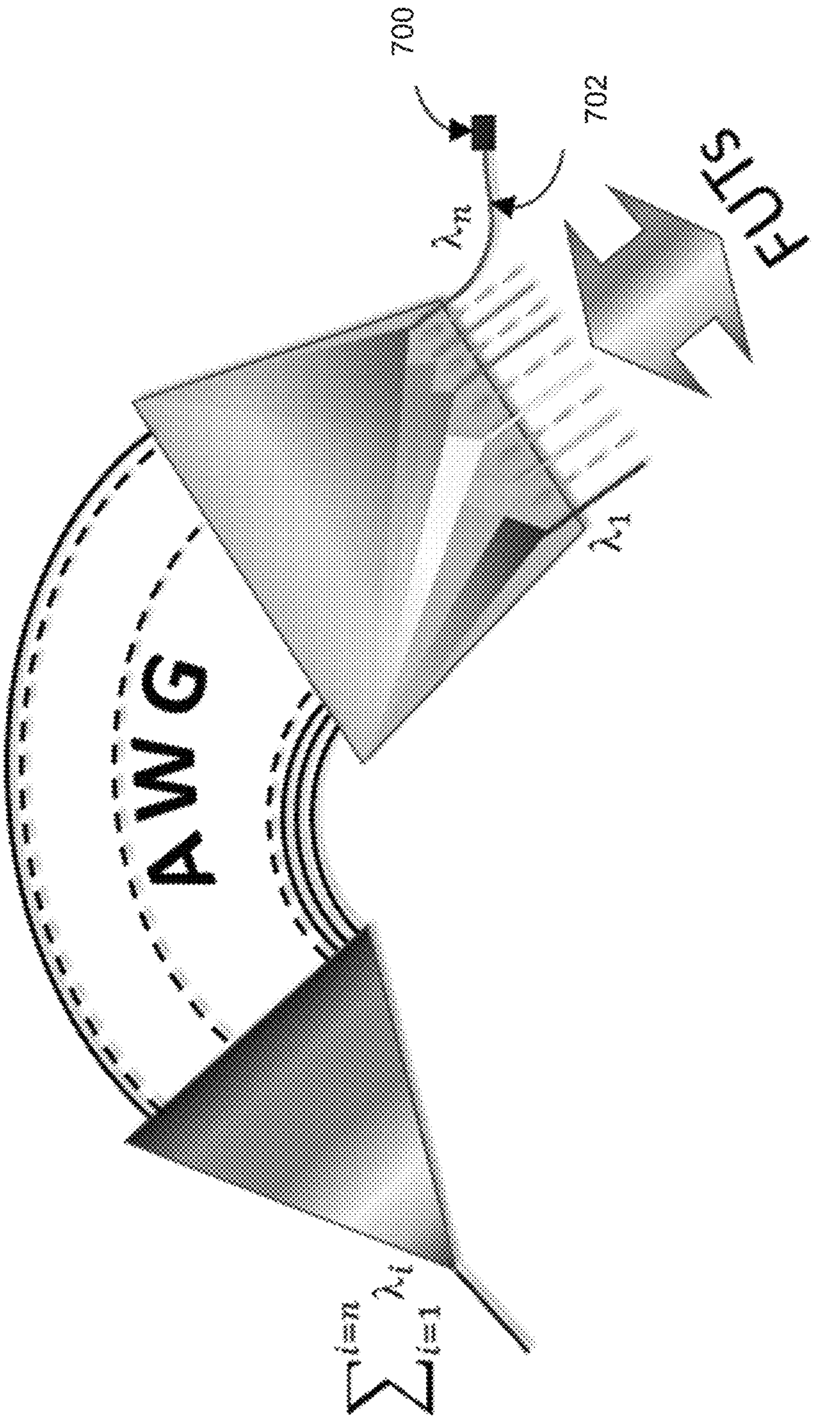
FIG. 7 illustrates different configurations used as a reflective element, in accordance with an example of the present disclosure.

FIG. 7 illustrates different configurations used as a reflective element, in accordance with an example of the present disclosure.

Referring to FIG. 7, different configurations may be used as a reflective element, such as a fiber pigtailed optical reflective marker, a connector embedded reflector 700 and/or 702, etc. Another type of reflective event that may be used includes a −14.8 dB reflection of a glass-air interface of an open PC connector. Alternatively, an open 8° angle-polished connector reflection of −55 dB, or the Rayleigh backscattering of a piece of fiber may be utilized.

Each of the AWG (or Mux/DeMux) inputs and outputs may be connected to optical fibers. This connection may be implemented by optically connecting each of the optical waveguide input/output to a telecom-type optical fiber, for example, a single-mode fiber of about 8 μm in core diameter and 125 μm in cladding diameter. With an objective of limiting the optical coupling losses which may increase the overall insertion loss of the component, these coupling losses may depend on several factors including some intrinsic to AWG (e.g., size and shape of the waveguide, index of the core and the cladding of the waveguide).

The AWGs (or Muxes/DeMuxes) may be supplied with fiber pigtails or connectorized fibers. Thus, a component assembled on the end of the output fiber of the reference channel or spliced on the end of the end fiber may be utilized.

In some cases, a component may not need to be added on one of the outputs of the AWG (or Mux/DeMux). When assembling an AWG, the output fibers may be assembled and aligned the output of each waveguide. In this regard, the end of the waveguide may be utilized as a reflective element. Without an AR coating on the AWG output facet, the generated reflectance may be of the order of 4% for silica-on-silicon (SoS) buried waveguides.

Figure 8:
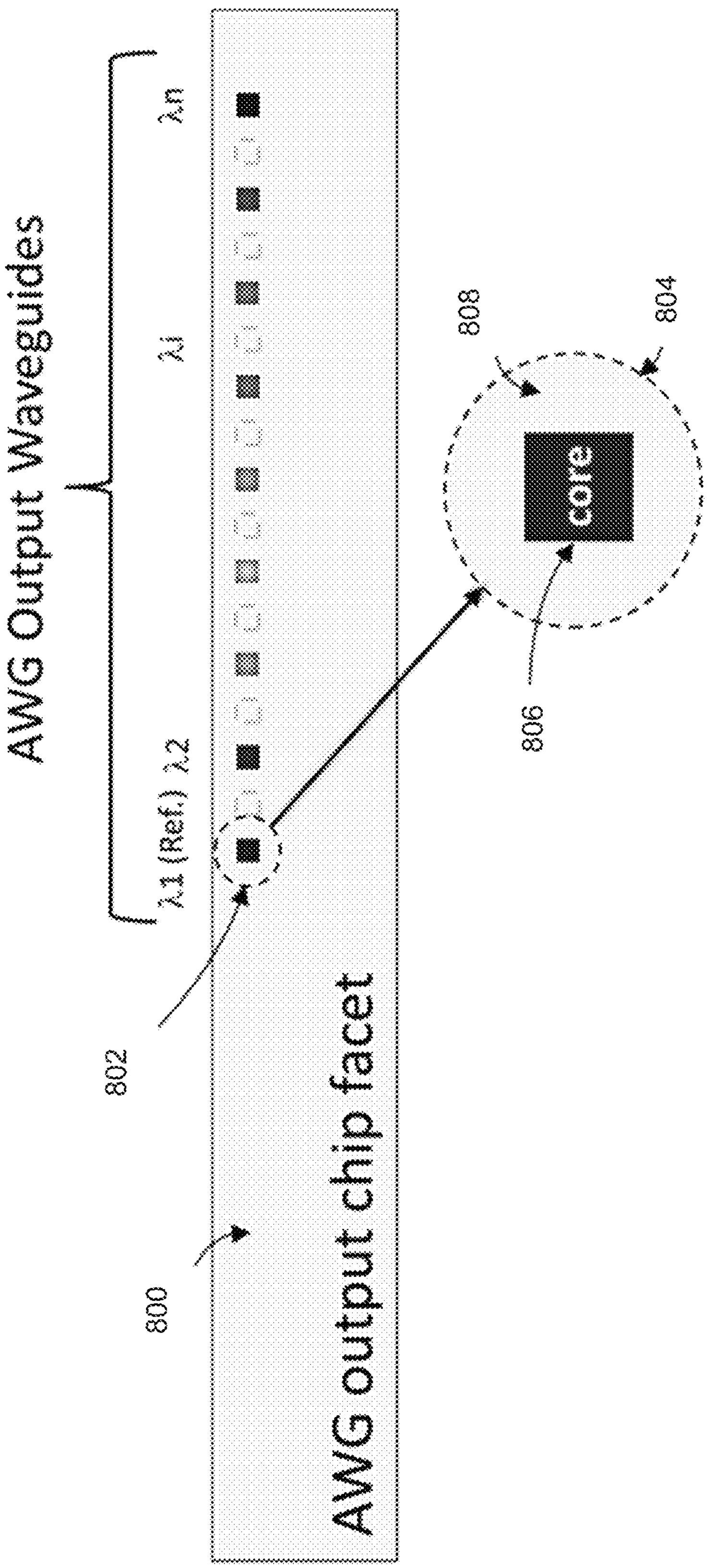
FIG. 8 illustrates an output face of an AWG planar light-wave circuit (PLC) chip and different ends of waveguides, in accordance with an example of the present disclosure.

FIG. 8 illustrates an output face of an AWG (or Mux/DeMux) planar light-wave circuit (PLC) chip and different ends of waveguides, in accordance with an example of the present disclosure.

Referring to FIG. 8, an output face of AWG 800 (or Mux/DeMux) planar light-wave circuit (PLC) chip is shown along with different ends of the waveguides, of which only one labeled as 802 will not be coupled to an output fiber. The zoomed area 804 on the waveguide shows the core 806 (square in this case) and the cladding 808 around it. The configuration of FIG. 8 allows for the avoidance of the addition of a reflector function outside the AWG package, and elimination of a waveguide-to-fiber coupling operation. In this example, in the case of silica-on-silicon (SoS) buried waveguides, without an AR coating, and with a $SiO_2$ buried rectangular waveguides and a low index of refraction contrast between the core (waveguide) and the cladding, the reflection will be closed to a −14 dB non-angled end-of-fiber. In another example, the fiber may be cut (perpendicularly to the fiber section) just after the optical coupling and use the same 4% reflection as reference reflectance.

As in the case of the use of athermal AWGs, the serialization of optical switches with AWG may make it possible to considerably increase the capacity in terms of the number of fibers monitored.

Figure 9:
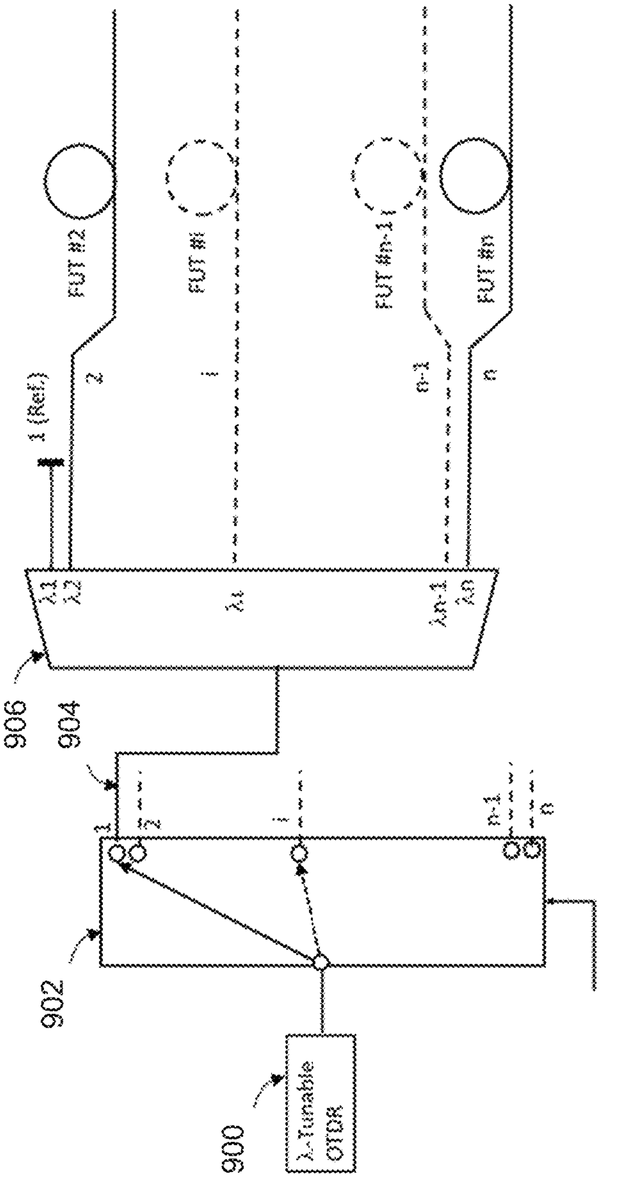
FIG. 9 illustrates a configuration where a tunable source OTDR is connected to an optical switch and each of the outputs can in turn be connected to a Mux/DeMux, one of the outputs of which is connected to a reflector, in accordance with an example of the present disclosure.

FIG. 9 illustrates a configuration where a tunable source OTDR is connected to an optical switch and each of the outputs can in turn be connected to an Mux/DeMux, one of the outputs of which is connected to a reflector, in accordance with an example of the present disclosure.

Referring to FIG. 9, a tunable source OTDR 900 may be connected to an optical switch 902. Each of the outputs 904 may in turn be connected to a Mux/DeMux 906, one of the outputs of which is connected to a reflector.

If several Muxes/DeMuxes are collocated in the same temperature environment (e.g., inside the same box), only one or a few of the Muxes/DeMuxes may be equipped with a reflective output. However, this may require knowledge of the Mux/DeMux relative wavelengths.

In the case of collocated Muxes/DeMuxes that are equipped with a reflective reference channel, the reference wavelength search phase may be carried out as a priority on one of the Muxes/DeMuxes, and if needed, from time to time on the others.

With respect to the configuration of FIG. 9, in some examples, parallel OTDRs may be utilized.

With respect to the lasers, various types of tunable lasers may be utilized, with each technology having an accessible tuning range (e.g., external cavity lasers with either mechanical, electrical or thermal tuning on wavelength selective element, distributed feedback (DFB) lasers or discrete mode lasers with direct electrical or thermal action on chip, or any arrangement of several such lasers). The tuning range and channel spacing may define the number of channels accessible (e.g., 10-GHz-Spaced, 1-GHz-Spaced Arrayed-Waveguide Grating, etc.).

DFB lasers may include a periodically structured element or diffraction grating that defines the operating wavelength. However, temperature changes may lead to changes in wavelength in a linear manner (typically 0.1 nm/° C.). The wavelength shift may be caused by the thermal expansion over the period of the laser grating. In addition to the shift in wavelength, the increase in temperature may cause a decrease in the optical power at the output of the laser. Further, the DFB wavelength may be sensitive to laser drive current (a phenomena called frequency chirp under direct modulation conditions). The increase in temperature may also have an impact on the optical power as laser output decreases with temperature. Thus, the wavelength of a DFB laser may be tuned by adjusting the operating temperature. Since the operating temperature range of a laser is limited, this may also limit the wavelength range.

Several Mux/DeMux ports may be tested at the same time from a single optical head, which may include using a single source and a single receiver, by utilizing an OFDM technique. The carrier spacing of the probe laser may match the Mux/DeMux spacing. Various techniques may be utilized to generate a comb of laser lines from a laser, for example, using a recirculating loop and an acousto-optic shifter, an electro-optic modulator and/or purely digital techniques, or using a mode-locked or a gain-switched laser, where the latter technique may be more realistic given the rather large frequency spacings and number of carriers that are considered. Given the high dynamic range of reflectometric signals, a low crosstalk between channels may be generally expected (e.g. <−50 dB), a second comb may be needed for the coherent detection scheme, with a slightly different spacing as the probe comb so as to generate individual beat frequencies for each channel that may be selectively isolated through electrical filtering, presumably better than would be obtained from a purely digital technique. The OFDM technique may be compatible with a fixed or a tunable laser, which may cover more channels than a sole OFDM technique may provide.

Figure 10:
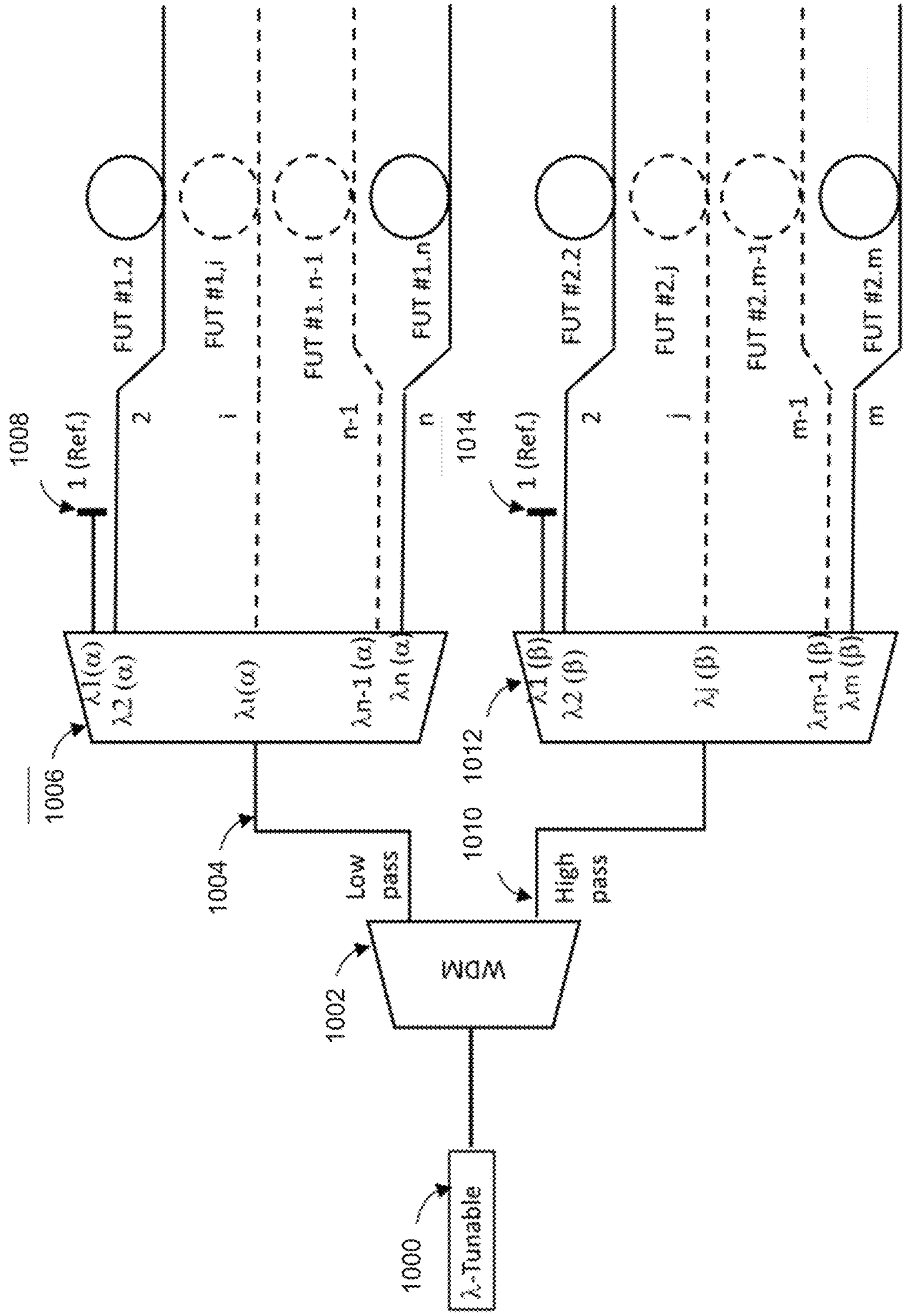
FIG. 10 illustrates the tuneability band of a tunable OTDR divided into two sub-bands (one high and the other low) using a demultiplexer (WDM), in accordance with an example of the present disclosure.

FIG. 10 illustrates the tuneability band of a tunable OTDR divided into two sub-bands (one high and the other low) using a demultiplexer (WDM), in accordance with an example of the present disclosure.

With respect to a combination of a WDM and a Mux/DeMux, FIG. 10 illustrates a fully passive configuration. The optical switch used previously may be replaced by a demultiplexer that splits the band used by the OTDR into two or more sub-bands. Each sub-band may be processed by a different Mux/DeMux. As shown in FIG. 10, the tuneability band of tunable OTDR 1000 may be divided into two sub-bands (one high and the other low) using a demultiplexer (WDM) 1002. The output low band WDM 1004 may be connected to the input of Mux/DeMux 1006 operating in this frequency band and having a reflective output 1008 on the reference channel. Similarly, the output of the high band WDM 1010 may be connected to the input of the Mux/DeMux 1012 operating in this frequency band and having a reflective output 1014 on the reference channel. The OTDR 1000 may be tunable continuously over the full band (high plus low band) and over both discontinuously. For example, the tunable OTDR may combine C+L band capabilities and be associated through a C Band–L band thin film coating technology WDM to two Muxes/DeMuxes (C-band Mux/DeMux+L-Band Mux/DeMux).

With respect to FIGS. 11-15 discussed below, compared to the aforementioned configurations, for FIGS. 11-15 the DeMux/Mux (e.g., Mux/DeMux or TFF Mux, etc.,) may be located inside the OTDR.

Figure 11:
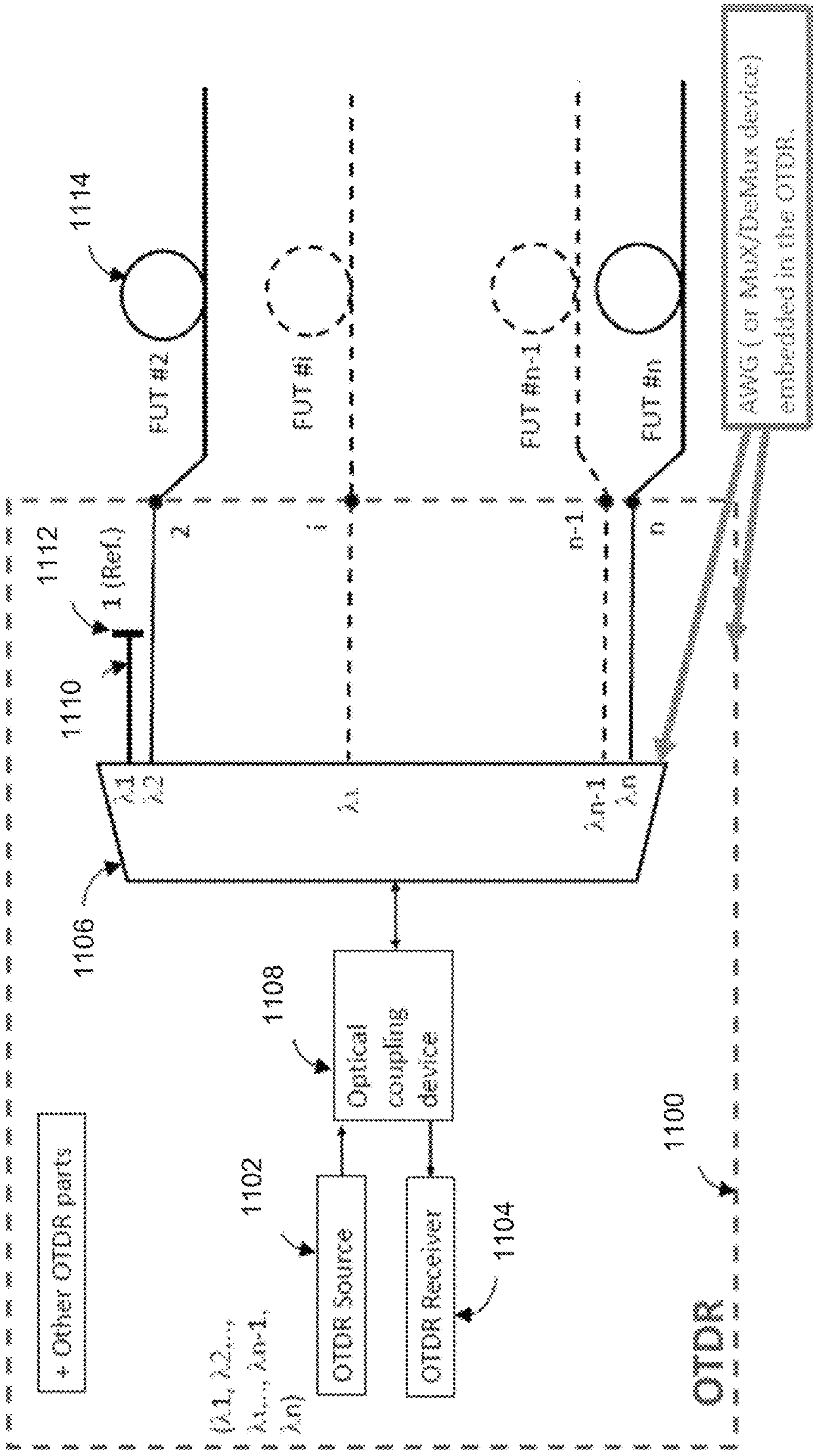
FIG. 11 illustrates a configuration that includes a MuX/DeMux device embedded in the OTDR, in accordance with an example of the present disclosure.

Specifically, FIG. 11 illustrates a configuration that includes an AWG (or MuX/DeMux device) embedded in the OTDR, in accordance with an example of the present disclosure.

Referring to FIG. 11, the Mux/DeMux component (e.g., including AWG or other technologies) may be integrated into the OTDR system. For example, OTDR system 1100 may include, among other things, a light source 1102, and an optical receiver 1104 coupled to the Mux/DeMux component 1106 via optical coupler 1108. In this configuration, reflective branch 1110 ending with reflective system 1112 may be located inside the OTDR 1100 system. The OTDR system 1100 may thus include n parallel outputs allowing the different fibers under test to be tested, such as the fiber 1114 for example. Wavelength alignment may be based on the reflectometric measurement of a reflective branch 1110, but also use the signal from a branch under test. Thus, compared to the aforementioned configurations related to FIGS. 1 and 4-10, the configuration of FIG. 11 may include the Mux/DeMux inside the OTDR box.

Figure 12:
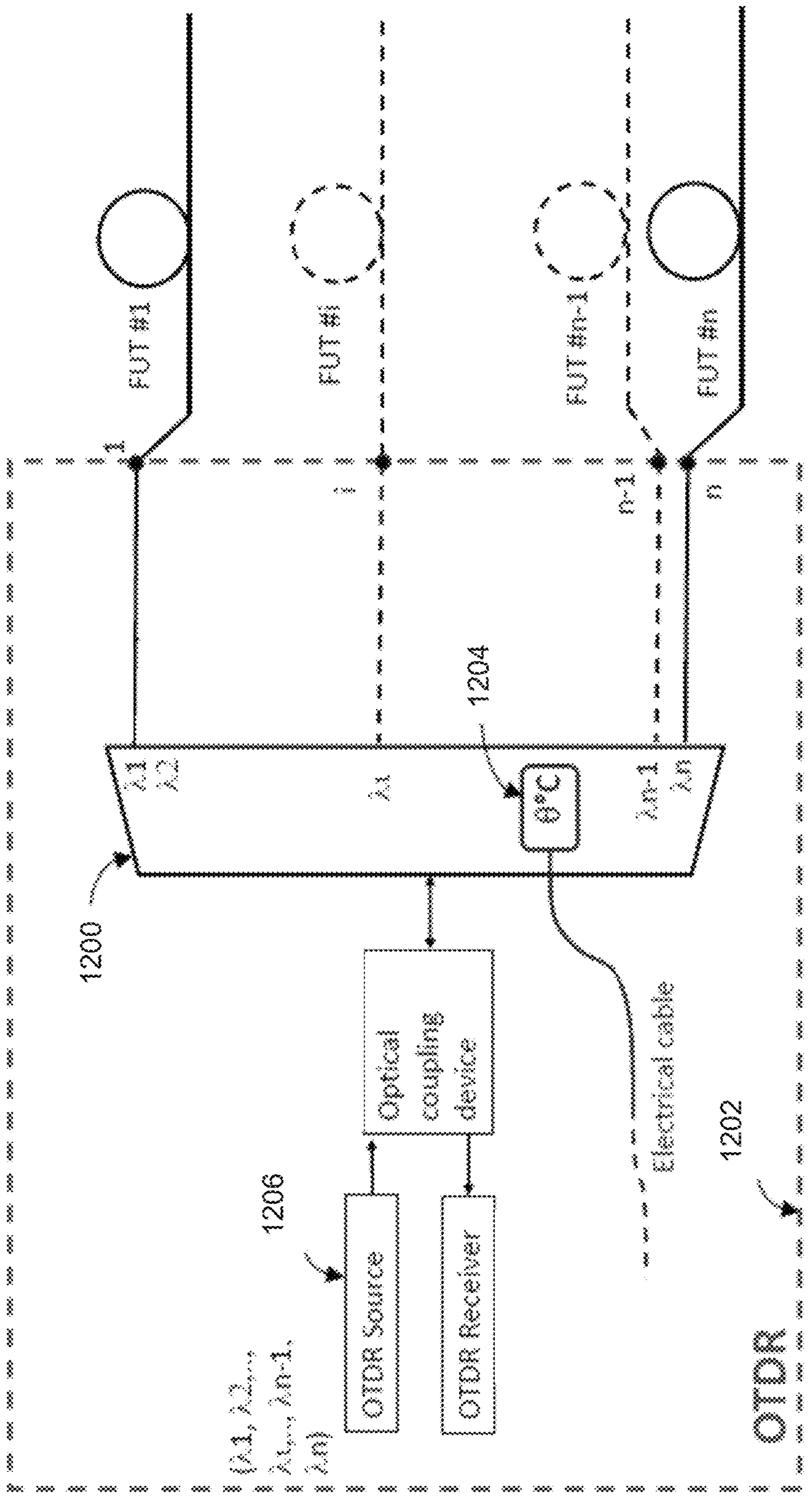
FIG. 12 illustrates a Mux/DeMux component located inside an OTDR system, in accordance with an example of the present disclosure.

FIG. 12 illustrates a Mux/DeMux component located inside an OTDR system, in accordance with an example of the present disclosure.

Referring to FIG. 12, with the DeMux/Mux component being located inside the OTDR, OTDR HW and component may be closed together in the same box. In some cases, electronic temperature sensors may require for electric cables to come out of the OTDR to measure the temperature at the contact or in the environment of the Mux/DeMux. With the sensor inside the OTDR system, the sensor may be directly interfaced with the OTDR electronics. For example, the sensor may be connected to an available bus such as a I2C bus to allow temperature readings, and thus modify the test wavelength of the OTDR accordingly.

In this regard, FIG. 12 illustrates a Mux/DeMux component 1200 located inside OTDR system 1202. An electronic sensor 1204 may thus be fixed or glued to the Mux/DeMux component in order to measure the temperature of this component, and use the latter to adjust the test wavelength of the source 1206 of the OTDR system 1202. In this configuration, the N outputs may be available for the test. Various types of temperature sensors may be utilized, and may include thermocouples, resistance temperature detectors (RTD), thermistors, and semiconductor based integrated circuits (IC). In one example, the temperature sensor may be interfaced with the electronics of the OTDR, for example via an i2CTM and SMBus communication interface that can support several sensors.

Figure 13:
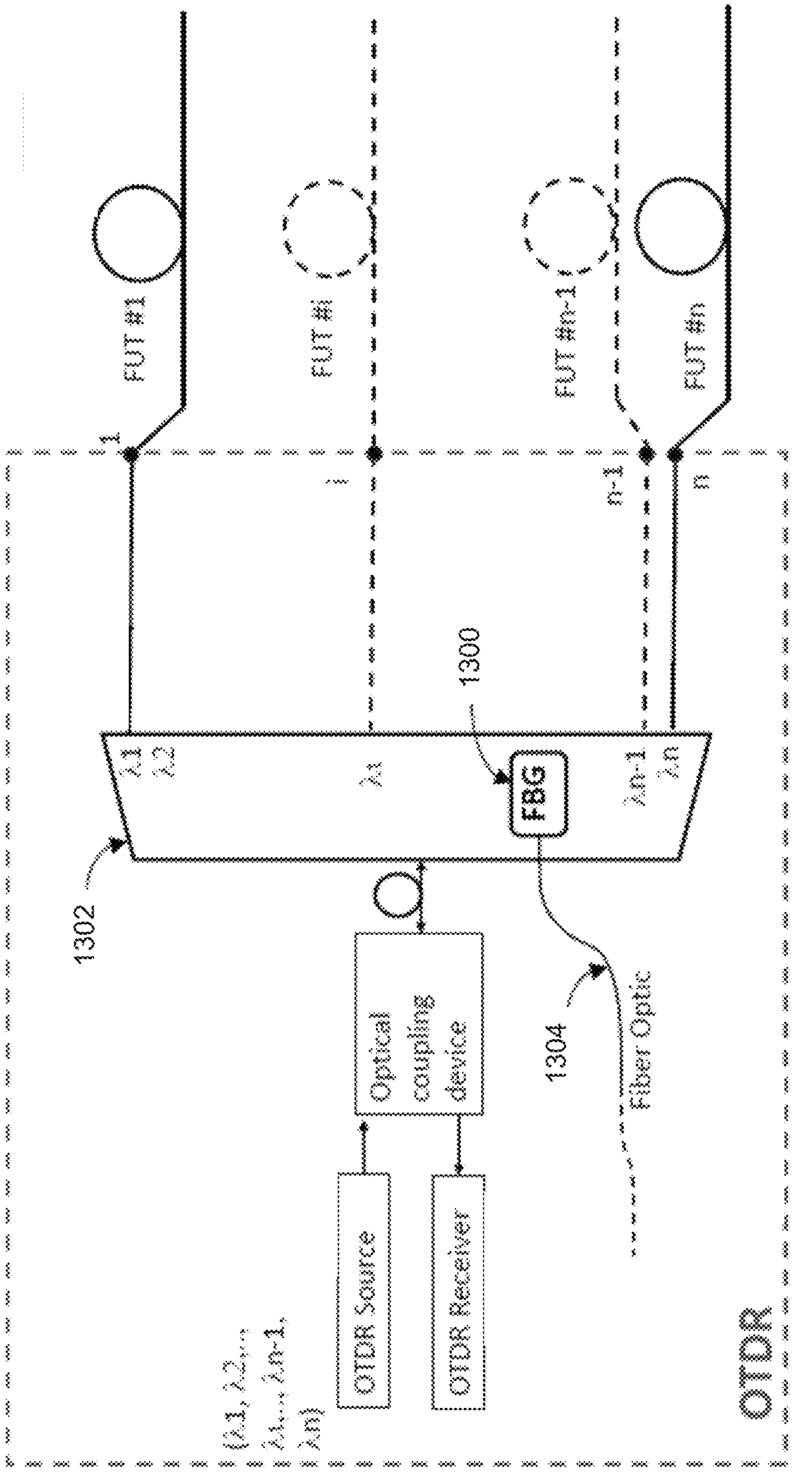
FIG. 13 illustrates use of an optical reference at a thermal contact of a Mux/DeMux component, interrogable via a fiber optic cable, in accordance with an example of the present disclosure.

FIG. 13 illustrates use of an optical reference at a thermal contact of a Mux/DeMux component, interrogable via a fiber optic cable, in accordance with an example of the present disclosure.

Referring to FIG. 13, with the Mux/DeMux inside the OTDR system, an internal optical temperature reference may be also inside the system. In this regard, FIG. 13 shows the use of an optical reference 1300 (FBG in this case) at the thermal contact of the Mux/DeMux 1302, interrogable via fiber optic cable 1304. It is noted that FIG. 13 does not represent the interrogation system connected to this fiber optic cable. Varying the OTDR test wavelength, the amplitude of this reflective device (e.g., optical reference 1300) may be determined and used to determine the effective wavelength of this reflective event and by the same temperature of the sensor associated to the Mux/DeMux 1302.

Figure 14A:
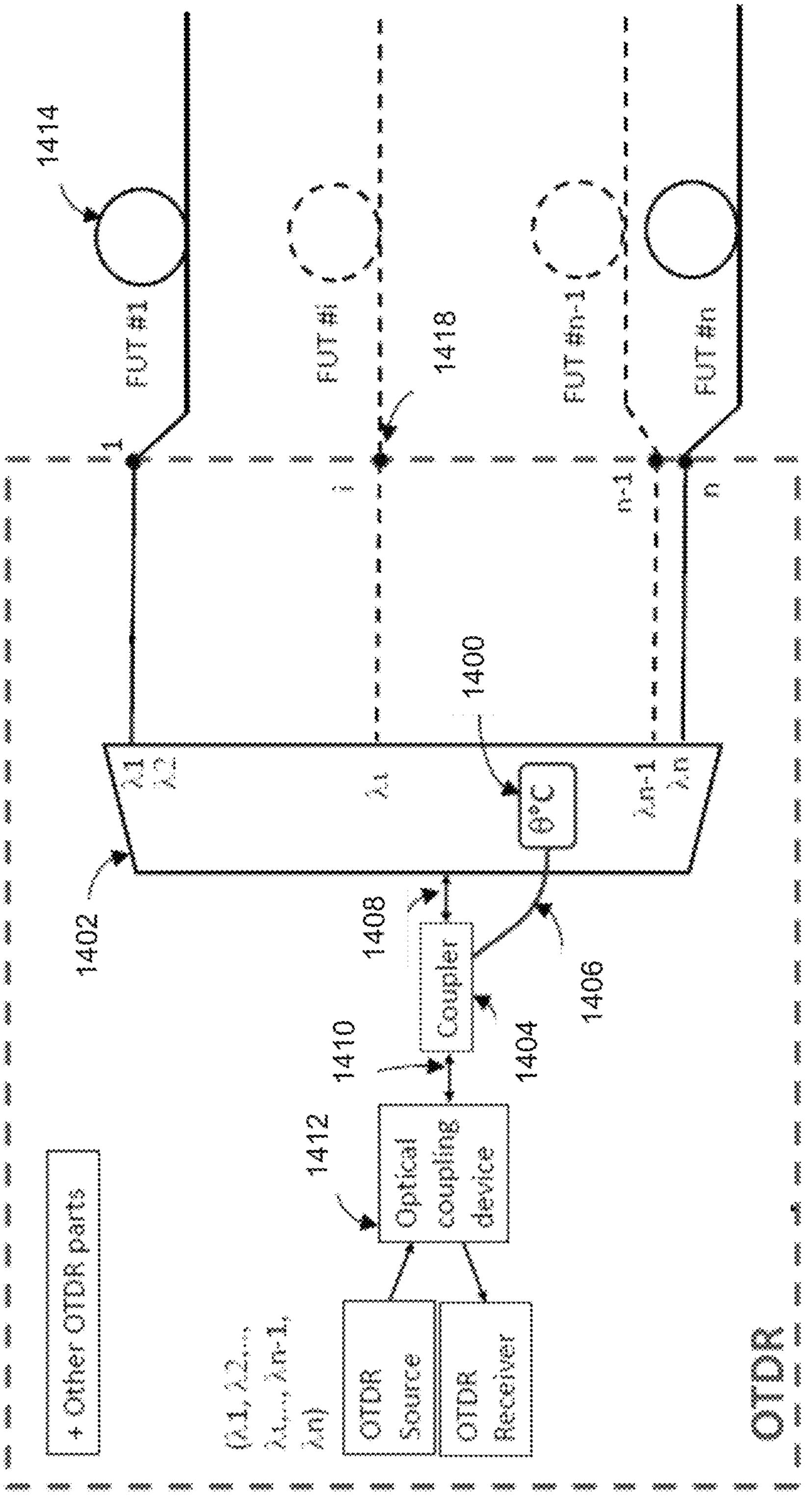
FIG. 14A illustrates use of an optical reference in thermal contact with a Mux/DeMux component, in accordance with an example of the present disclosure.
Figure 14B:
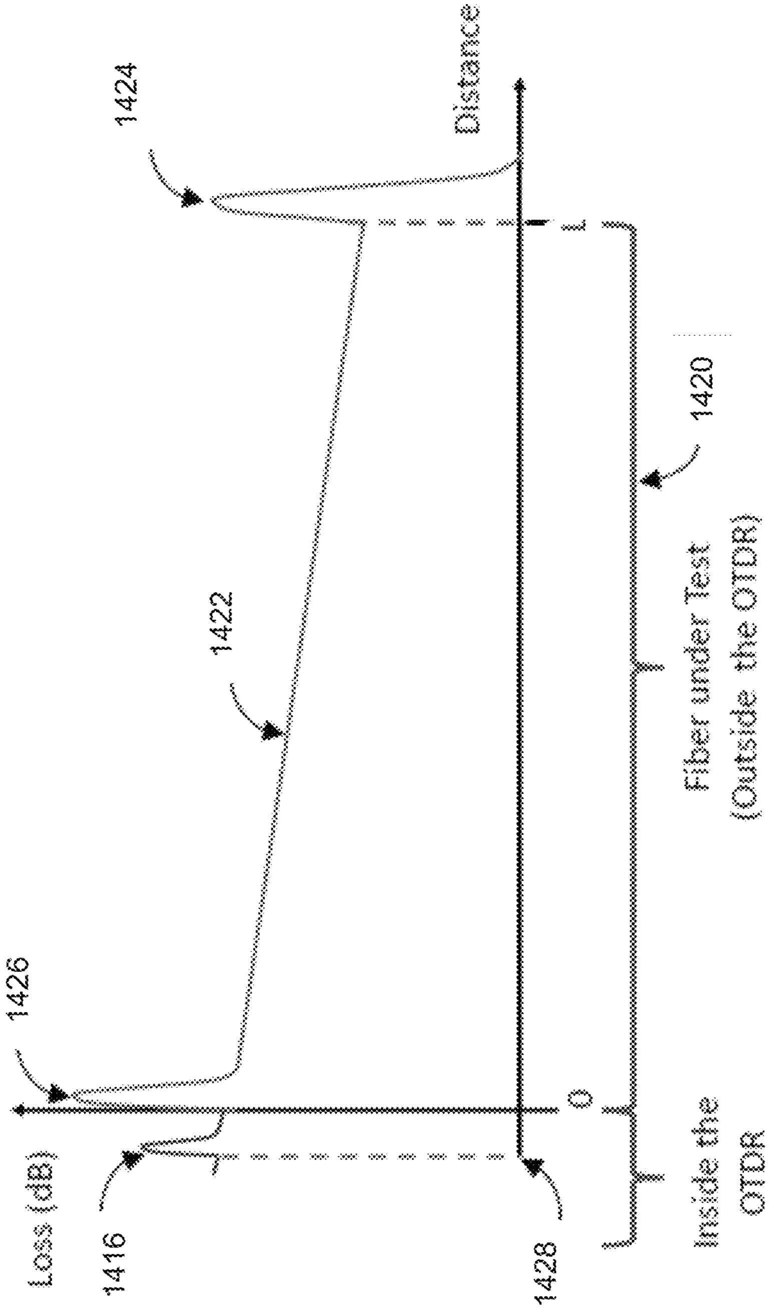
FIG. 14B illustrates an example of an OTDR trace based on the configuration described in FIG. 14A, in accordance with an example of the present disclosure.

FIG. 14A illustrates use of an optical reference in thermal contact with a Mux/DeMux component, in accordance with an example of the present disclosure. FIG. 14B illustrates an example of an OTDR trace based on the configuration described in FIG. 14A, in accordance with an example of the present disclosure.

Referring to FIGS. 14A and 14B, an unbalanced coupler may be used to sense an OTDR embedded reference (e.g., FBG or others) while measuring the fiber under test. FIG. 14A illustrates use of an optical reference 1400 (e.g., FBG, F-P, or other temperature-sensitive point sensor) in thermal contact with Mux/DeMux 1402. The sensor (e.g., the optical reference 1400) may be connected to optical coupler 1404 via optical fiber 1406. The optical coupler 1404 may be an unbalanced coupler that maximizes the transmission between its ports 1408 and 1410, and distributes a lower part of the transmission power by the OTDR source via the coupler 1412.

The optical fiber 1406 may be shorter than the connecting fiber to the Mux/DeMux component. In this case, the reference signal may appear before the distance origin on the reflectometric curve resulting from the reflectometric traces associated with a fiber under test (e.g., 1414) and the reflectometric curve associated with the optical reference 1400.

Referring to FIGS. 14A and 14B, in the case of a reference (e.g., optical reference 1400 of FIG. 14A) generating a reflective peak (e.g., 1416 of FIG. 14B) such as for example an FBG or a reflector using reflective optics, this reflective peak 1416 may appear at a distance less than those of the signals generated by the Mux/DeMux 1402 or output connectors (e.g., 1418).

FIG. 14B may represent part 1420 of the reflectometric trace corresponding to the fiber under test, such as linear part 1422 and the end reflections 1424 and 1426. The reference signal may correspond to the part embedded in the OTDR, and may therefore be located at a distance 1428 preceding the origin of the distance axis. The variation in amplitude of this reflective peak 1416 may be used to determine the wavelength of this event and by the same temperature of the sensor associated with the Mux/DeMux 1402. This temperature information may thus serve as a temperature reference for the definition of the wavelength of the OTDR to be used for each wavelength channel of the Mux/DeMux 1402.

The use of an unbalanced coupler 1404 may make it possible to limit the insertion loss impacting the measurement of the fibers under test. The reflectance of the optical reference 1400 may be chosen so that the amplitude of the reflection is clearly visible on the OTDR curve without saturating the input stage of the device. Replacing the 2×1 OTDR coupler (e.g., APD/Laser/Line) by a 2×2 unbalanced or balanced coupler may impact the OTDR dynamic range.

Figure 15:
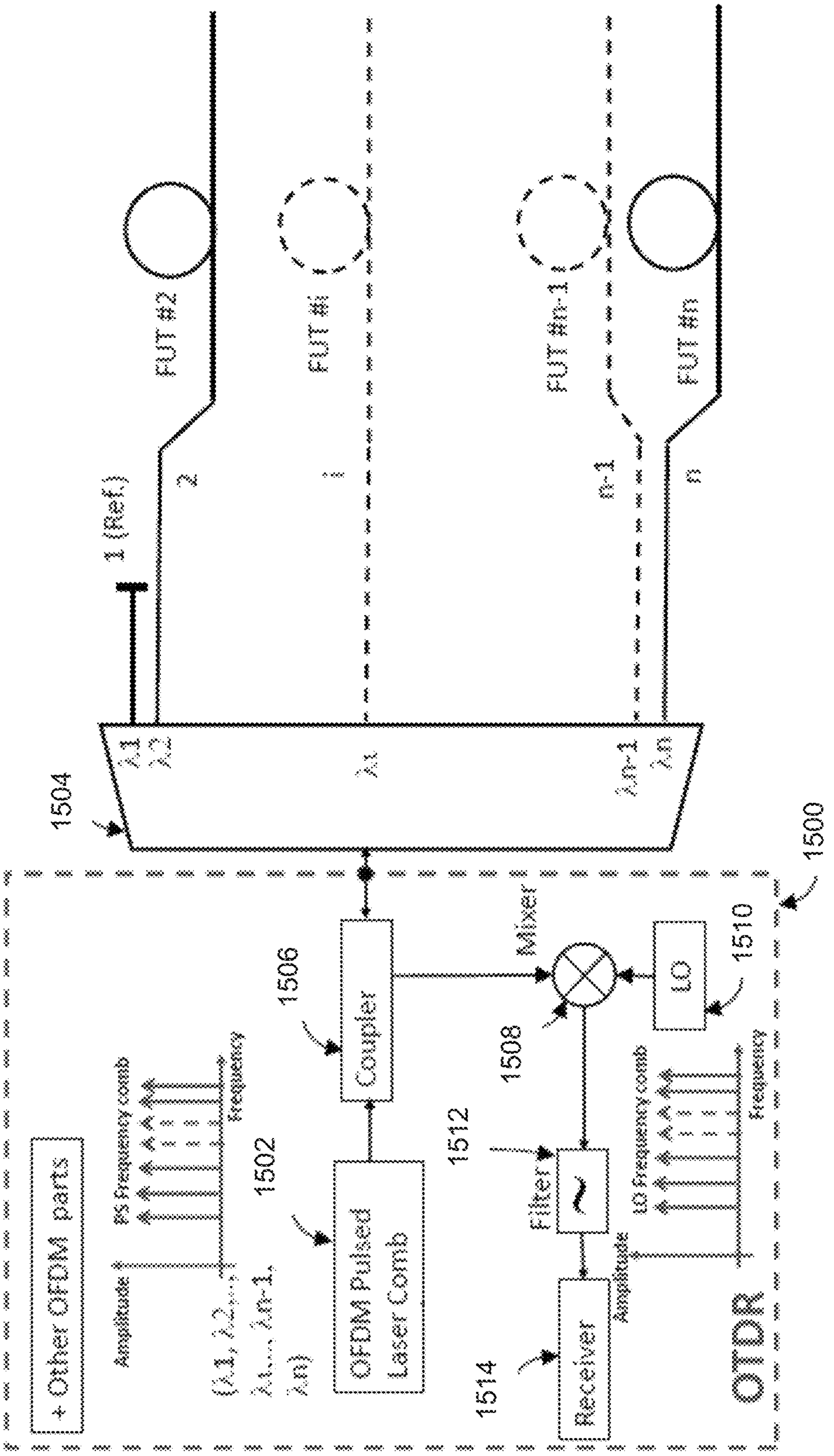
FIG. 15 illustrates an orthogonal frequency-division multiplexing (OFDM) technique applied to parallel multiport testing, in accordance with an example of the present disclosure.

FIG. 15 illustrates an orthogonal frequency-division multiplexing (OFDM) technique applied to parallel multiport testing, in accordance with an example of the present disclosure.

Referring to FIG. 15, the principle of OFDM 1500 may include distributing several sub-carriers over a signal that is to be transmitted, each of the sub-carriers corresponding to a channel of the component to be tested. A pulsed signal (PS) supporting N multiple carriers may be generated by source 1502 and sent to the system under test 1504. Local oscillator laser comb may be mixed with a backscattered signal on a coherent receiver. The signal backscattered by the fibers under test may then be coupled back to the receiver chain by coupler 1506, and mixed at 1508 with a local oscillator 1510 whose frequency comb is slightly shifted. The spacing between each frequency of the transmit comb and that of the receive comb may be different but relatively close to match the spacing of the Mux/DeMux channels. At the output of the mixer at 1508, the signals contain the N beat frequencies due to the frequency difference between the source 1502 comb and the LO (local oscillator) 1510 comb is then low pass filtered at 1512 before reaching the receiver 1514. With such a measurement unit, it may be possible to simultaneously test the N wavelength channels of the Mux/DeMux.

Figure 16:
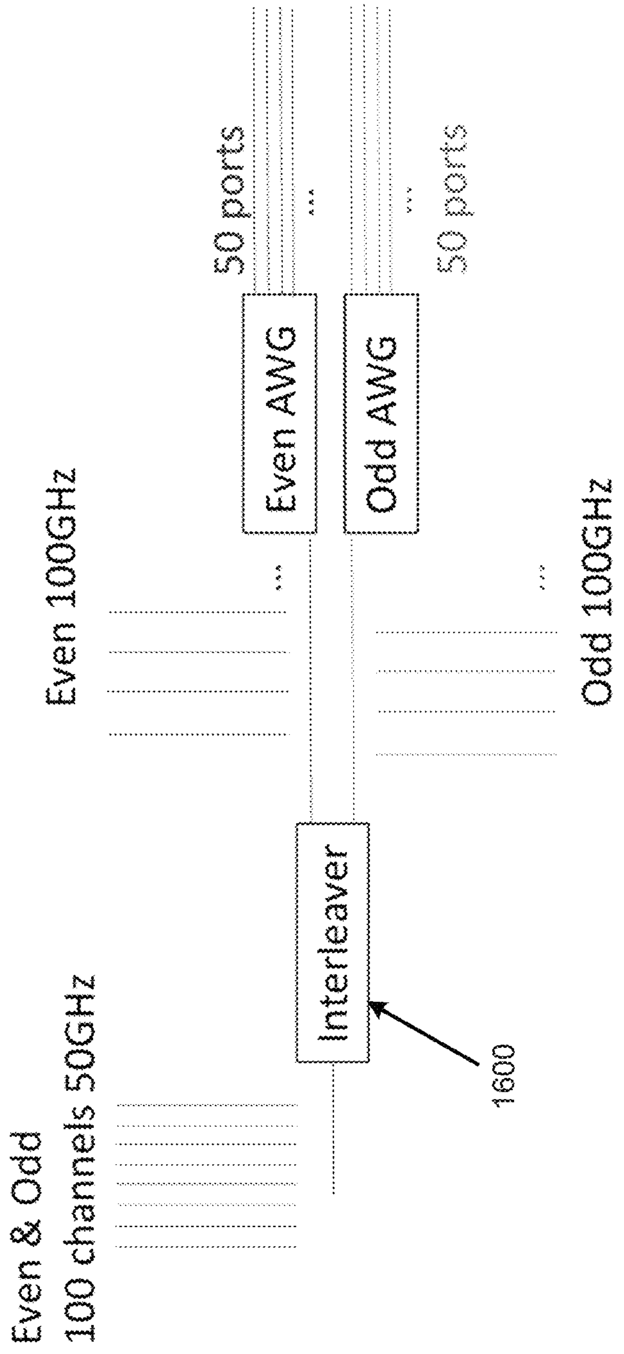
FIG. 16 illustrates an example for a 1×2 interleaver, formed similarly as a Mux/DeMux, in accordance with an example of the present disclosure.

FIG. 16 illustrates an example for a 1×2 interleaver, formed similarly as a Mux/DeMux, in accordance with an example of the present disclosure.

Referring to FIG. 16, an example for a 1×2 interleaver 1600, made of a same material/technology as a Mux/DeMux, therefore drifting together, is shown. In this regard, in some cases, it is desirable to maximize the number of addressable ports, while at the same time minimizing the wavelength range to simplify the tunable source design. The number of wavelengths of Mux/DeMux may be increased by reducing the spacing between channels. Another tradeoff may be obtained by combining several Muxes/DeMuxes (hereafter N Muxes/DeMuxes), each having the same channel spacing(S) but an offset frequency S/N in between each comb. The N Muxes/DeMuxes may then be multiplexed with an N-output-ports interleaver. The interleaver would then be designed to split an initial spectrum with a channel spacing S/N, into N interleaved comb with a spacing S and an offset frequency matching the Mux/DeMux at each of its output. Since the Muxes/DeMuxes are freely drifting with the same temperature dependence, the offset frequency of the Mux/DeMux may be set and controlled at a single and same temperature. The interleaver may also be matched at the same temperature, and have a same or close temperature dependency, potentially by using the exact same PLC materials and process, potentially on a same chip, or a close material (tapered fiber or bulk glass interferometer), and potentially exploiting some partial compensation to tune the thermal drift to the expected value if it was required. In this interleaved configuration, as opposed to the use of optical switches and band splitters, the interleaver and Muxes/DeMuxes may be housed in the same box, so that they share the same ambient temperature. The combination of an interleaver and Mux/DeMux may also reduce the crosstalk between ports, compared to a single Mux/DeMux configuration at the same spacing.

Figure 17:
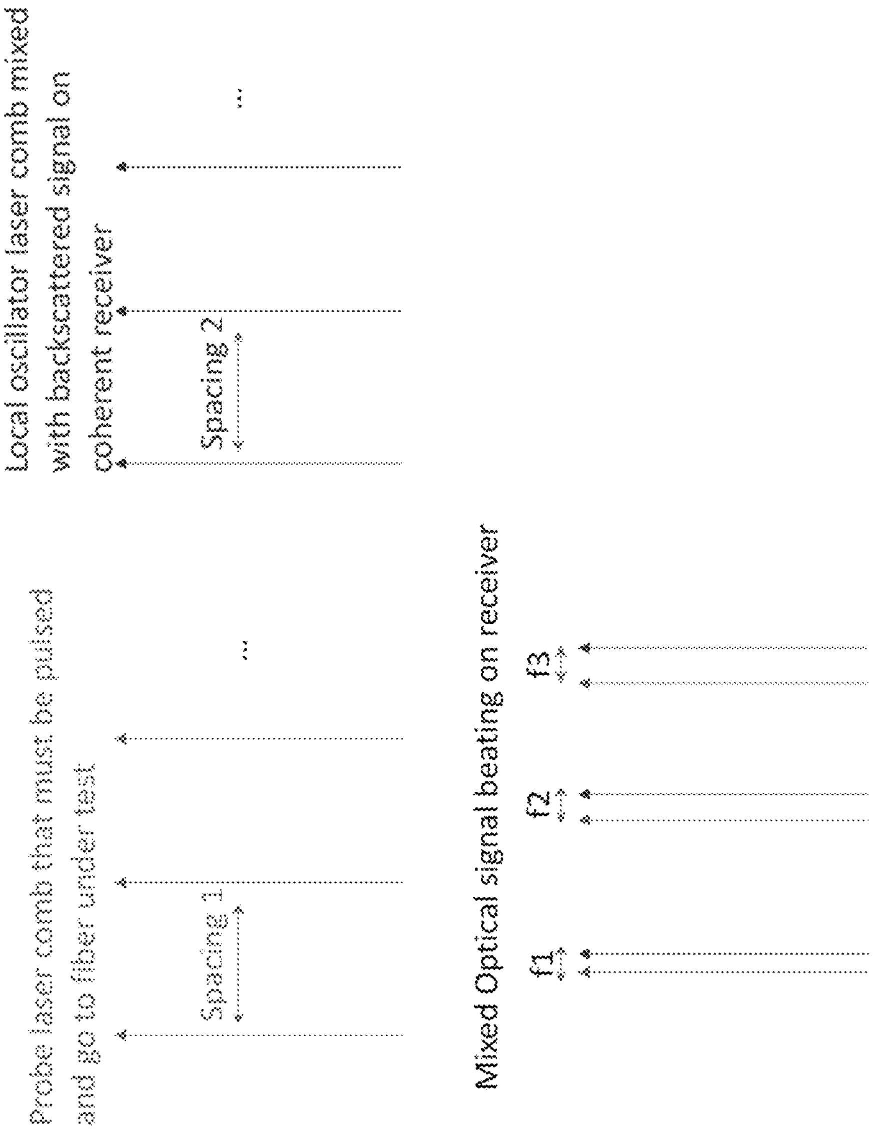
FIG. 17 illustrates an OFDM technique adapted to parallel multi-port testing, in accordance with an example of the present disclosure.

FIG. 17 illustrates an OFDM technique adapted to parallel multi-port testing, in accordance with an example of the present disclosure.

Referring to FIG. 17, the laser comb that is pulsed may be probed. A local oscillator laser comb may be mixed with the backscattered signal on a coherent receiver. Each signal from each fiber plugged to a Mux/DeMux may include an individual beat term frequency that may be isolated through signal processing and therefore acquired in parallel.

An electronic sensor may be used to serve as a temperature reference taken from the component (Mux/DeMux). It may be sufficient to connect this component to a bus of the OTDR electronics via 2-wire buses (e.g., I2C, SMBus), or another bus to perform the monitoring and tuning of the test wavelength. In some cases, it may be needed to know or precharacterize the Mux/DeMux.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:

a tunable dense wavelength division multiplexing (DWDM) optical time domain reflectometer (OTDR) comprising a fiber optic link analyzer, executed by at least one hardware processor, to tune a test wavelength of the tunable DWDM OTDR to an effective wavelength of DWDM channels;

a non-temperature compensated multiplexer/demultiplexer (Mux/DeMux) located separate from, collocated with, or embedded within the tunable DWDM OTDR to selectively connect, based on the test wavelength, the tunable DWDM OTDR to a fiber optic link of a plurality of fiber optic links to test the fiber optic link, wherein the Mux/DeMux includes an arrayed waveguide grating (AWG), and wherein each AWG input and AWG output is connected to an optical fiber; and a reflective optical connector connected to an output of the Mux/DeMux to provide a reference for setting the test wavelength of the tunable DWDM OTDR on a selected channel of the Mux/DeMux, wherein the fiber optic link analyzer is executed by the at least one hardware processor to:

identify, based on comparison of a real-time trace to traces acquired at different wavelengths associated with the fiber optic link, a central wavelength of a reference channel of the Mux/DeMux;

scan a range of wavelengths around a presumed central wavelength; and utilize the central wavelength of the reference channel to recalculate central wavelengths of other channels of the Mux/DeMux.

2. The apparatus according to claim 1, wherein the central wavelength is implemented to redefine different test wavelengths of the plurality of fiber optic links through the Mux/DeMux.

3. The apparatus according to claim 1, further comprising:

an optical switch, wherein the tunable DWDM OTDR is connected to a plurality of Muxes/DeMuxes, including the Mux/DeMux, through the optical switch.

4. The apparatus according to claim 1, wherein the tunable DWDM OTDR further comprises a thermo-cooled distributed feedback laser that utilizes temperature to adjust a laser wavelength.

5. The apparatus according to claim 1, wherein the reflective optical connector includes an optical connector assembled at an end of an output fiber associated with the selected channel of the Mux/DeMux.

6. The apparatus according to claim 1, wherein the reflective optical connector includes a reference channel waveguide output facet that is part of a Mux/DeMux chip.

7. The apparatus according to claim 1, wherein the reflective optical connector includes a connectorized optical reflector that is plugged at an end of an output fiber associated with the selected channel of the Mux/DeMux.

8. The apparatus according to claim 1, further comprising:

an electronic sensor connected to the tunable DWDM OTDR and disposed adjacent to the Mux/DeMux to measure a temperature of the Mux/DeMux.

9. The apparatus according to claim 8, wherein the electronic sensor is wirelessly connected to the DWDM OTDR.

10. The apparatus according to claim 1, further comprising:

a fiber optic sensor connected to the tunable DWDM OTDR by a fiber optic coupler, wherein the fiber optic sensor is disposed adjacent to the Mux/DeMux to measure a temperature of the Mux/DeMux.

11. The apparatus of claim 1, wherein an output fiber is aligned to the AWG output, and wherein an end of the AWG output is implemented as a reflective element.

12. An apparatus comprising:

a tunable dense wavelength division multiplexing (DWDM) optical time domain reflectometer (OTDR) to tune a test wavelength of the DWDM OTDR to an effective wavelength of DWDM channels;

a non-temperature compensated multiplexer/demultiplexer (Mux/DeMux) collocated with the tunable DWDM OTDR to selectively connect, based on the test wavelength, the DWDM OTDR to a fiber optic link of a plurality of fiber optic links, wherein the Mux/DeMux includes an arrayed waveguide grating (AWG), and wherein each AWG input and AWG output is connected to an optical fiber; and a reflective optical connector connected to an output of the Mux/DeMux to provide a reference for setting the test wavelength of the tunable DWDM OTDR on a selected channel of the Mux/DeMux, wherein a fiber optic link analyzer is to;

identify, based on comparison of a real-time trace to traces acquired at different wavelengths associated with the fiber optic link, a central wavelength of a reference channel of the Mux/DeMux;

scan a range of wavelengths around a presumed central wavelength; and utilize the central wavelength of the reference channel to recalculate central wavelengths of other channels of the Mux/DeMux.

13. The apparatus according to claim 12, wherein the reflective optical connector includes:

an optical connector assembled at an end of an output fiber associated with the selected channel of the Mux/DeMux;

a reference channel waveguide output facet that is part of a Mux/DeMux chip; or a connectorized optical reflector that is plugged at an end of the output fiber associated with the selected channel of the Mux/DeMux.

14. The apparatus according to claim 12, wherein the Mux/DeMux is embedded into the tunable DWDM OTDR.

15. The apparatus according to claim 14, further comprising:

an electronic sensor connected to the tunable DWDM OTDR and disposed adjacent to the Mux/DeMux to measure a temperature of the Mux/DeMux.

16. The apparatus of claim 12, wherein an output fiber is aligned to the AWG output, and wherein an end of the AWG output is implemented as a reflective element.

17. An apparatus comprising:

an optical time domain reflectometer (OTDR) comprising a fiber optic link analyzer, executed by at least one hardware processor, to control an optical MEMS switch and optimize transmission properties of the optical MEMS switch, wherein the optical MEMS switch is collocated with or distant to the OTDR;

a non-temperature compensated multiplexer/demultiplexer (Mux/DeMux) located at a distant location, collocated with, or embedded within the OTDR, including an arrayed waveguide grating (AWG), and wherein each AWG input and AWG output is connected to an optical fiber; and a fiber optic link including a reflective optical connector connected to an output of the optical MEMS switch, wherein the fiber optic link analyzer is executed by the at least one hardware processor to:

identify, based on comparison of a real-time trace to traces acquired at different wavelengths associated with the fiber optic link, a central wavelength of a reference channel of the Mux/DeMux;

scan a range of wavelengths around a presumed central wavelength; and utilize the central wavelength of the reference channel to recalculate central wavelengths of other channels of the Mux/DeMux.

18. The apparatus according to claim 17, wherein the optical MEMS switch comprises an optical microelectromechanical systems (MEMS) switch, and wherein an insertion loss of the optical MEMS switch is optimized by changing positioning of a first angle and a second angle of a MEMS mirror of the optical MEMS switch, and a maximization routine based on reflected or backscattered signals downward of a switch port of the optical MEMS switch.

19. The apparatus according to claim 17, wherein the optical MEMS switch comprises an optical variable optical attenuator, and wherein an insertion loss of the optical variable optical attenuator is controlled based on reflected or backscattered signals downward of the optical variable optical attenuator.

20. The apparatus according to claim 17, wherein the optical MEMS switch comprises a bidirectional optical amplifier, and wherein an insertion loss of the bidirectional optical amplifier is controlled based on reflected or backscattered signals downward of the bidirectional optical amplifier.

* * * * *